(12) United States Patent
Min et al.

(10) Patent No.: US 8,441,977 B2
(45) Date of Patent: May 14, 2013

(54) METHODS AND APPARATUSES FOR EFFICIENTLY USING RADIO RESOURCES IN WIRELESS COMMUNICATION SYSTEM BASED ON RELAY STATION (RS)

(75) Inventors: Chan-Ho Min, Yongin-si (KR); Tak-Ki Yu, Yongin-si (KR); Myeon-Kyun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 776 days.

(21) Appl. No.: 12/231,389

(22) Filed: Sep. 2, 2008

(65) Prior Publication Data

US 2009/0059838 A1 Mar. 5, 2009

(30) Foreign Application Priority Data

Sep. 3, 2007 (KR) .................. 10-2007-0088973

(51) Int. Cl.
*H04B 7/14* (2006.01)
*H04B 3/36* (2006.01)
*H04W 4/00* (2009.01)

(52) U.S. Cl.
USPC ........... 370/315; 370/328; 370/329; 370/331; 370/352; 370/392; 455/7; 455/422.1; 455/436; 455/442; 709/248

(58) Field of Classification Search .......... 370/228–463; 455/436–522
See application file for complete search history.

(56) References Cited

U.S. PATENT DOCUMENTS

| | | | | |
|---|---|---|---|---|
| 5,682,601 | A * | 10/1997 | Sasuta | 455/437 |
| 6,625,134 | B1 * | 9/2003 | Ji et al. | 370/331 |
| 7,139,589 | B2 * | 11/2006 | Sawada | 455/553.1 |
| 7,159,042 | B1 * | 1/2007 | Morvan et al. | 709/248 |
| 7,747,783 | B2 * | 6/2010 | Morvan et al. | 709/248 |
| 7,792,067 | B2 * | 9/2010 | Sheu et al. | 370/311 |
| 7,801,081 | B2 * | 9/2010 | Choi et al. | 370/331 |
| 7,872,999 | B2 * | 1/2011 | Saito et al. | 370/328 |
| 7,881,276 | B2 * | 2/2011 | Hsu et al. | 370/341 |
| 7,885,678 | B2 * | 2/2011 | You et al. | 455/522 |
| 7,889,699 | B2 * | 2/2011 | Suh et al. | 370/331 |
| 7,894,388 | B2 * | 2/2011 | Visotsky | 370/329 |
| 7,933,236 | B2 * | 4/2011 | Wang et al. | 370/328 |
| 7,944,879 | B2 * | 5/2011 | Choi et al. | 370/329 |
| 7,957,257 | B2 * | 6/2011 | Zhou et al. | 370/204 |
| 7,979,076 | B2 * | 7/2011 | Hui et al. | 455/450 |
| 8,050,685 | B2 * | 11/2011 | Han et al. | 455/450 |
| 8,134,979 | B2 * | 3/2012 | Jin et al. | 370/335 |
| 8,140,077 | B2 * | 3/2012 | Saifullah et al. | 455/438 |
| 8,170,031 | B2 * | 5/2012 | Sundaresan | 370/395.4 |
| 8,200,233 | B2 * | 6/2012 | Kim et al. | 455/448 |
| 8,340,591 | B2 * | 12/2012 | Lin et al. | 455/67.13 |
| 2004/0264417 | A1 * | 12/2004 | Heikkila et al. | 370/335 |
| 2006/0128410 | A1 * | 6/2006 | Derryberry et al. | 455/509 |

(Continued)

*Primary Examiner* — Ayaz Sheikh
*Assistant Examiner* — Venkatesh Haliyur

(57) ABSTRACT

Methods and apparatuses for efficiently using radio resources in a wireless communication system based on a relay station are provided. An operating method of a relay station (RS) for efficiently using radio resources in a wireless communication system based on the RS. The method includes setting a call with a sending terminal; checking whether a receiving terminal of the sending terminal travels in the same RS cell, in a different RS cell of the same base station (BS) cell, or in a different cell of a neighbor BS; and checking a destination address of a data and relaying the data to the receiving terminal according to a result of the checking.

20 Claims, 20 Drawing Sheets

U.S. PATENT DOCUMENTS

| | | | |
|---|---|---|---|
| 2006/0285505 A1* | 12/2006 | Cho et al. | 370/254 |
| 2007/0076684 A1* | 4/2007 | Lee et al. | 370/350 |
| 2007/0086387 A1* | 4/2007 | Kang et al. | 370/331 |
| 2007/0086388 A1* | 4/2007 | Kang et al. | 370/331 |
| 2007/0105558 A1* | 5/2007 | Suh et al. | 455/436 |
| 2007/0105592 A1* | 5/2007 | Kang et al. | 455/561 |
| 2007/0110005 A1* | 5/2007 | Jin et al. | 370/335 |
| 2007/0218908 A1* | 9/2007 | Kang et al. | 455/442 |
| 2007/0224991 A1* | 9/2007 | Kang et al. | 455/436 |
| 2007/0237107 A1* | 10/2007 | Jang et al. | 370/315 |
| 2007/0254586 A1* | 11/2007 | Lee et al. | 455/11.1 |
| 2007/0258407 A1* | 11/2007 | Li et al. | 370/331 |
| 2007/0265026 A1* | 11/2007 | You et al. | 455/522 |
| 2007/0275656 A1* | 11/2007 | Chang et al. | 455/9 |
| 2007/0280172 A1* | 12/2007 | Tan et al. | 370/335 |
| 2007/0298778 A1* | 12/2007 | Chion et al. | 455/422.1 |
| 2008/0009241 A1* | 1/2008 | Do et al. | 455/9 |
| 2008/0019305 A1* | 1/2008 | Dekorsy et al. | 370/329 |
| 2008/0039013 A1* | 2/2008 | Chang et al. | 455/11.1 |
| 2008/0081626 A1* | 4/2008 | Choi et al. | 455/442 |
| 2008/0108326 A1* | 5/2008 | Park et al. | 455/411 |
| 2008/0112365 A1* | 5/2008 | Kwun et al. | 370/332 |
| 2008/0125125 A1* | 5/2008 | Choi et al. | 455/436 |
| 2008/0165719 A1* | 7/2008 | Visotsky | 370/315 |
| 2008/0171553 A1* | 7/2008 | Ren et al. | 455/450 |
| 2008/0220716 A1* | 9/2008 | Tsai et al. | 455/7 |
| 2009/0075587 A1* | 3/2009 | Yu et al. | 455/7 |
| 2009/0082002 A1* | 3/2009 | Kim et al. | 455/418 |
| 2009/0303918 A1* | 12/2009 | Ma et al. | 370/315 |
| 2010/0120392 A1* | 5/2010 | Youn et al. | 455/404.1 |
| 2011/0124312 A1* | 5/2011 | Kwon et al. | 455/404.2 |
| 2011/0134887 A1* | 6/2011 | Jeon et al. | 370/331 |
| 2011/0230187 A1* | 9/2011 | Jeon et al. | 455/434 |
| 2011/0286349 A1* | 11/2011 | Tee et al. | 370/252 |
| 2011/0319013 A1* | 12/2011 | Jung et al. | 455/7 |
| 2012/0003962 A1* | 1/2012 | Jeon et al. | 455/411 |

* cited by examiner

METHODS AND APPARATUSES FOR EFFICIENTLY USING RADIO RESOURCES IN WIRELESS COMMUNICATION SYSTEM BASED ON RELAY STATION (RS)

CROSS-REFERENCE TO RELATED APPLICATION(S) AND CLAIM OF PRIORITY

This application claims priority under 35 U.S.C. §119 (a) to a Korean patent application filed in the Korean Intellectual Property Office on Sep. 3, 2007 and assigned Serial No. 2007-88973, the entire disclosure of which is hereby incorporated by reference.

TECHNICAL FIELD OF THE INVENTION

The present invention relates generally to a wireless communication system based on a relay station. More particularly, the present invention relates to methods and apparatuses for efficiently using radio resources in the wireless communication system based on the relay station.

BACKGROUND OF THE INVENTION

Researches are conducted on a multi-hop relay transmission technique which is an efficient data delivery scheme in an ad-hoc system. Recently, the multi-hop transmission scheme is attracting much attention as the technique to extend a service coverage of the cell at a low cost and to provide a high-speed data transmission to users in the wireless communication system. For example, the Institute of Electrical and Electronics Engineers (IEEE) 802.16j standard group is standardizing a Mobile Multihop Relay (MMR) technology.

A multihop transmission using a relay station (RS) in a wireless communication system is illustrated by referring to FIGS. 1, 2 and 3.

FIG. 1 depicts a conventional communication scenario between mobile stations (MSs) in the same RS service coverage in the wireless communication system. For communications, the MS 111 and the MS 112 in the same service coverage of the RS 110 operate in the wireless communication system as follows.

Provided that the MS 111 sends data to the MS 112, the first transmission 113 is made from the MS 111 to the RS 110 and the second transmission 114 is made from the RS 110 to a base station (BS) 100. The third transmission 115 is made from the BS 100 to the RS 110. Finally, the fourth transmission 116 is made from the RS 110 to the MS 112. For the data delivery from the MS 111 to the MS 112, radio resources are required for the data transmissions per interval (MS 111-RS 110, RS 110-BS 100, BS 100-RS 110, and RS 110-MS 112).

FIG. 2 depicts a conventional communication scenario between MSs in different RS service coverage within the same cell in a wireless communication system. The communications between the MSs in the same cell of the wireless communication system is performed as follows. Herein, the communication scenario between the MSs in the same cell considers that the MSs communicate via different RSs respectively within the same cell.

Provided that the MS 211 sends data to the MS 221, the MS 211 makes the first transmission 212 to an RS 210 and the RS 210 makes the second transmission 213 to a BS 200. Next, the BS 200 makes the third transmission 214 to an RS 220 and the RS 220 makes the fourth transmission 215 to the MS 221. As in FIG. 1, the data transmission from the MS 211 to the MS 221 requires radio resources per interval (MS 211-RS 210, RS 210-BS 200, BS 200-RS 220, and RS 220-MS 221).

FIG. 3 depicts a conventional communication scenario between MSs in neighbor cells of a wireless communication system. The communications between the MS 325 and the MS 341 in the neighbor cells of the wireless communication system is performed as follows.

An RS 320 belongs to a coverage of a BS 300, and an RS 340 belongs to a coverage of a BS 310. To transmit data from the MS 325 to the MS 341, the first transmission 321 is made from the MS 325 to the RS 320 and the second transmission 322 is made from the RS 320 to the BS 300. The BS 300 sends the data to the BS 310 over a backbone network. Next, the BS 310 makes the third transmission 323 to the RS 340 and the RS 340 makes the fourth transmission 324 to the MS 341. Hence, as in FIGS. 1 and 2, the data transmission from the MS 325 to the MS 341 requires radio resources per interval (MS 325-RS 320, RS 320-BS 300, BS 310-RS 340, and RS 340-MS 341) and a wired resource between the BS 300 and the BS 310 over the backbone network.

Utilization of the radio resource for the relay transmission is explained by referring to FIGS. 4 and 5 showing an Orthogonal Frequency Division Multiplexing (OFDM) frame structure.

FIG. 4 depicts a conventional half-duplex OFDM frame structure.

An uplink and a downlink in FIG. 4 are separated based on a transmission time. The DownLink (DL) transmission starts with one preamble symbol, a Frame Control Header (FCH), DL-MAP, UL-MAP, and data symbols in order. Receive/transmit Transition Gap (RTG) and Transmit/receive Transition Gap (TTG), which are guard times to distinguish UL and DL transmission times, are inserted between frames and between the downlink and the uplink at the end respectively.

The preamble symbol is used for network synchronization and cell search. The FCH symbol is used to carry frame constitution information. The DL MAP symbols include Information Element (IE) and constitution information of bursts transmitted in the downlink, and the UL MAP symbols include IE and constitution information of bursts transmitted in the uplink.

For the relay transmission, the frame can be divided into a BS frame 400 and an RS frame 410 based on subcarriers. In various implementations, the frame can be divided based on the transmission time. Herein, the BS frame 400 is subdivided into a DownLink (DL) subframe 401 and an UpLink (UL) subframe 402. The DL subframe 401 is subdivided into an access zone 403 and a relay zone 404. The access zone 403 is used to transmit data from the BS to the MS, and the relay zone 404 is used to transmit data from the BS to the RS. Likewise, the UL subframe 402 is subdivided into an access zone 405 and a relay zone 406. The access zone 405 is used to transmit data from the MS to the BS, and the relay zone 406 is used to receive data at the BS from the RS. The RS frame 410 is divided to a DL subframe 411 and a UL subframe 412. The DL subframe 411 is subdivided into an access zone 413 and a relay zone 414. The access zone 413 is used to transmit data from RS to the MS, and the relay zone 414 is used to receive data at the RS from the BS. Likewise, the UL subframe 412 is subdivided into an access zone 415 and a relay zone 416. The access zone 415 is used to transmit data from the MS to the RS, and the relay zone 416 is used to transmit data from RS to the BS.

For the relay transmission of FIGS. 1, 2 and 3, the first data transmission is performed to the access zone 415 of the UL subframe 412 through the UL MAP information of the DL subframe 411. The second data transmission is performed to the relay zone 406 of the UL subframe 402 through the relay UL MAP information of the DL subframe 401. The third data transmission is conducted to the relay zone 404 of the DL subframe 401 through the relay DL MAP information of the DL subframe 401. The fourth data transmission is conducted to the access zone 413 of the DL subframe 411 through the DL MAP information of the DL subframe 411.

FIG. 5 depicts a conventional full-duplex OFDM frame structure.

The preamble, the FCH, the DL MAP, and the UL MAP of the frame of FIG. 5 are substantially the same as in FIG. 4 and are thus not further explained.

For the full-duplex transmission, a BS frame 500 that is used to transmit data from the BS to the RS or the MS and data from the RS or the MS to the BS, a first RS frame 510 that is used to receive data from the BS to the RS and to receive data from the MS to the RS, and a second RS frame 520 that is used to transmit data from the RS to the MS and to transmit data from the RS to the BS are allocated to different frequency bands.

For the relay transmission of FIGS. 1, 2 and 3, the first data transmission is conducted into the access zone of the UL subframe 512 of the first RS frame 510. For the first data transmission, UL MAP information of the DL subframe 521 of the second RS frame 520 is used. Next, the second data transmission is performed into the relay zone of the UL subframe 522 of the second RS frame 520. For the second data transmission, UL MAP information of the DL subframe 501 of the BS frame 500 is used. The third data transmission is conducted into the relay/access zone of the DL subframe 502 of the BS frame 500. For the third data transmission, DL MAP information of the DL subframe 501 of the BS frame 500 is used. Next, the fourth data transmission is made into the access zone of the DL subframe 521 of the second RS frame 520. For the fourth data transmission, DL MAP information of the DL subframe 521 of the second RS frame 520 is used.

As discussed above, for the relay transmission in the wireless communication system based on the relay station, separate resources are allocated to the paths respectively. As a result, as the number of the relay hops increases, more resources are required.

SUMMARY OF THE INVENTION

To address the above-discussed deficiencies of the prior art, it is a primary object of the present invention to address at least the above mentioned problems and/or disadvantages and to provide at least the advantages described below. Accordingly, an aspect of the present invention is to provide methods and apparatuses for efficiently using radio resources in a wireless communication network based on a relay station.

The above aspects are achieved by providing an operating method of a relay station (RS) for efficiently using radio resources in a wireless communication system based on the RS. The method includes setting a call with a sending terminal; checking whether a receiving terminal of the sending terminal travels in the same RS cell, in a different RS cell of the same base station (BS) cell, or in a different cell of a neighbor BS; and checking a destination address of data and relaying the data to the receiving terminal according to a result of the checking.

According to one aspect of the present invention, an operating method of a BS for efficiently using radio resources in a wireless communication system based on a RS, includes receiving call setup information from an RS; and allocating a resource for connection between RSs.

According to another aspect of the present invention, an apparatus for a RS for efficiently using radio resources in a wireless communication system based on the RS, includes a call setter for setting a call with a sending terminal; a receiving terminal checker for checking whether a receiving terminal of the sending terminal travels in the same RS cell, in a different RS cell of the same base station (BS) cell, or in a different cell of a neighbor BS; and a controller for checking a destination address of data and relaying the data to the receiving terminal according to a result of the checking.

According to yet another aspect of the present invention, an apparatus for a BS for efficiently using radio resources in a wireless communication system based on a RS, includes a controller for receiving call setup information from an RS; and a resource allocator for allocating a resource for connection between RSs.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 6 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide methods and apparatuses for efficiently using radio resources in a wireless communication system based on a relay station.

Figure 6:
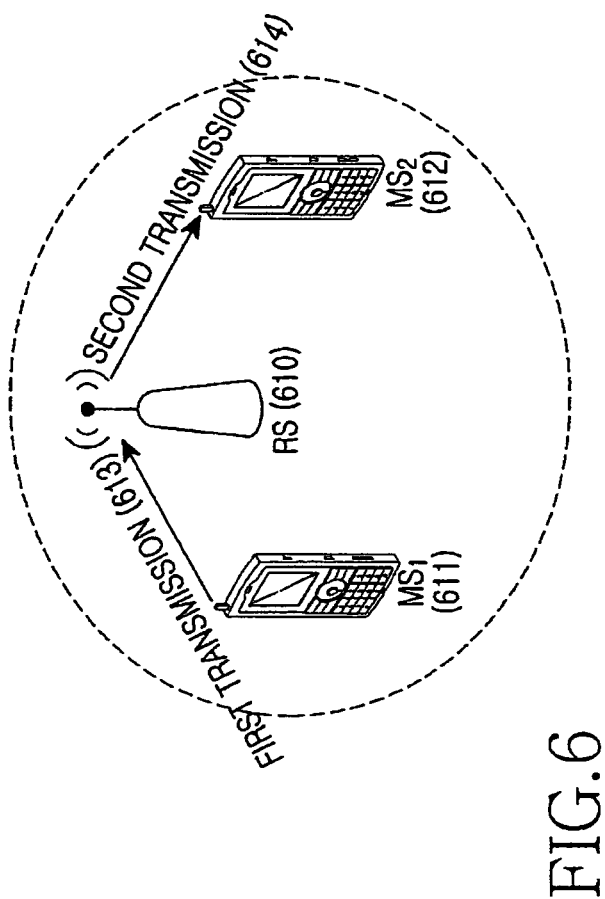
FIG. 6 illustrates a communication scenario between MSs in the same RS service coverage in a wireless communication system according to one exemplary embodiment of the present invention.
Figure 6:
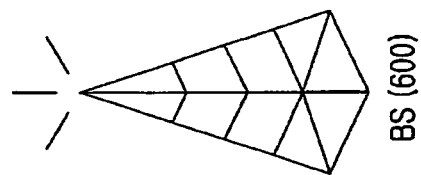

FIG. 6 illustrates a communication scenario (hereafter, referred to as a first scenario) between mobile stations (MSs) in the same relay station (RS) service coverage of a wireless communication system according to one exemplary embodiment of the present invention.

Figure 1:
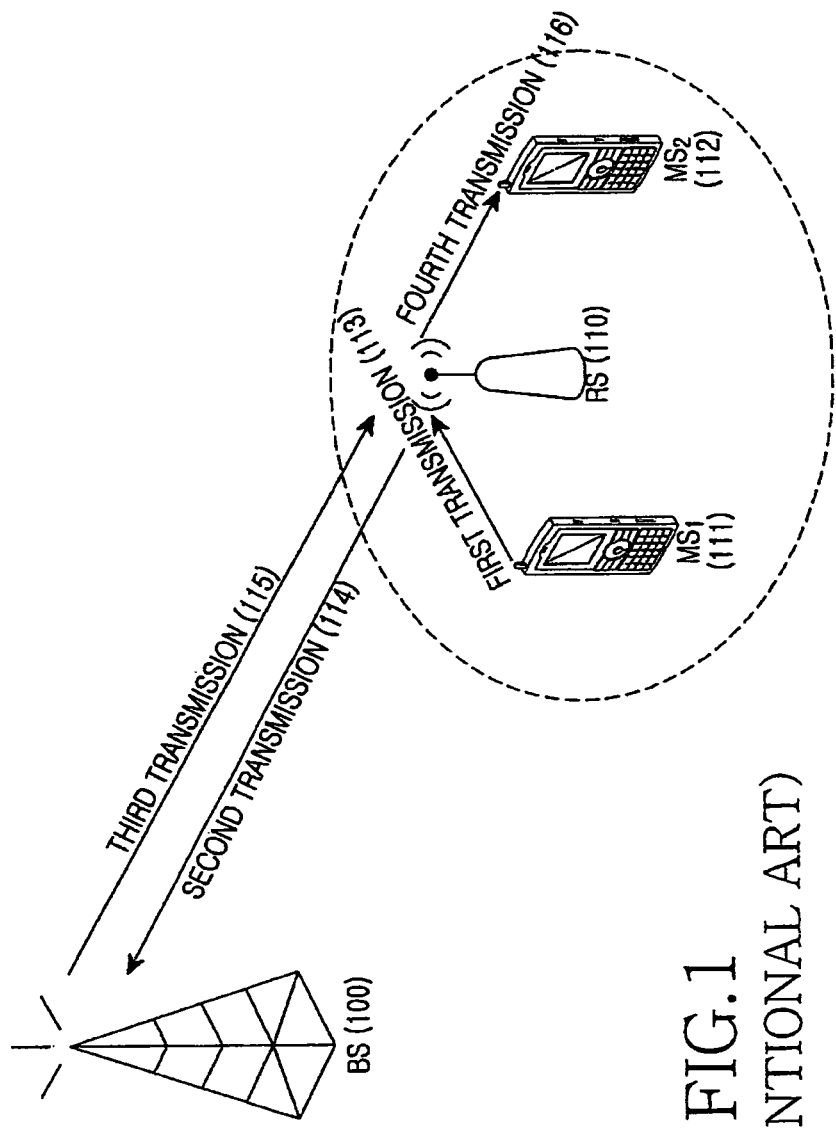
FIG. 1 illustrates a conventional communication scenario between mobile stations (MSs) in the same relay station (RS) service coverage in a wireless communication system.

Provided that an MS 611 transmits data to an MS 612 in the same RS service coverage, the first transmission 613 is made from the MS 611 to an RS 610 and the second transmission 614 is made from the RS 610 to the MS 612. Compared to the conventional method of FIG. 1, the communications of the first scenario require radio resources only for the MS 611-RS 610 interval and the RS 610-MS 612 interval. The method of the present invention is more advantageous than the conventional method in terms of the radio resource efficiency.

Figure 7:
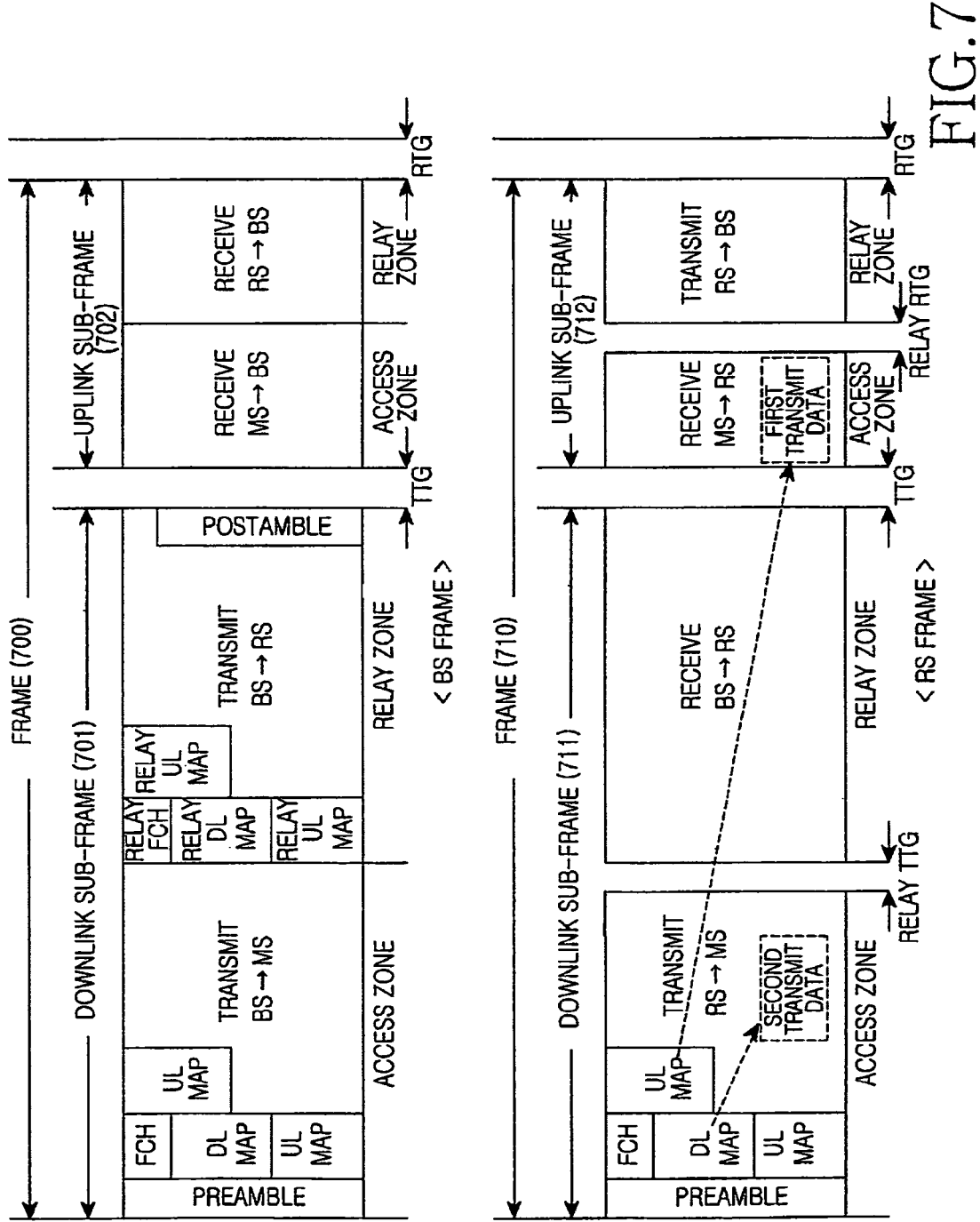
FIG. 7 illustrates a half-duplex frame structure of FIG. 6.
Figure 8:
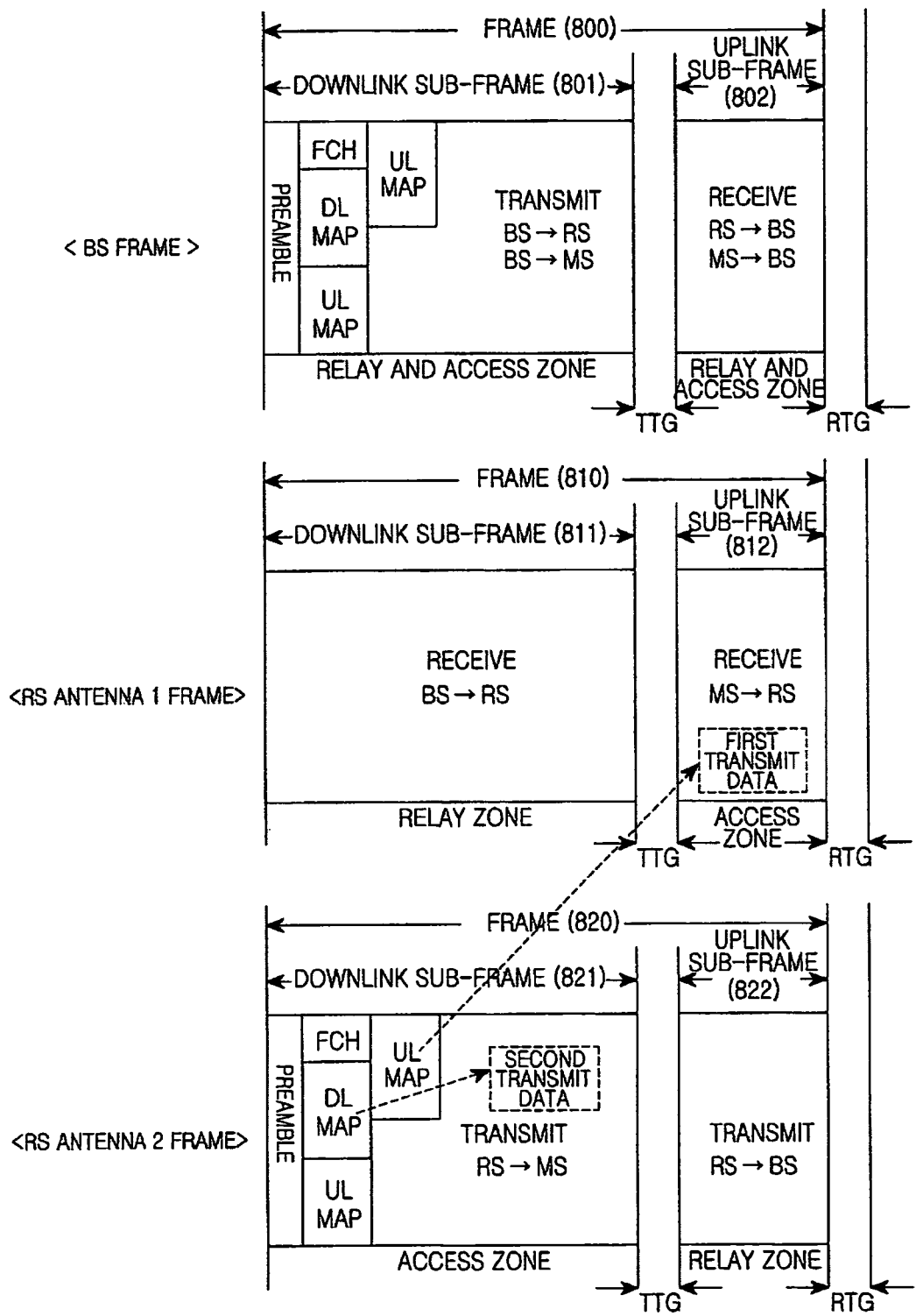
FIG. 8 illustrates a full-duplex frame structure of FIG. 6.

The basic frame structure is now explained by referring to FIG. 7 showing a half-duplex frame structure and FIG. 8 showing a full-duplex frame structure.

A base station (BS) frame 700 for communications between the BS and the RS and communications between the BS and the MS includes a DownLink (DL) subframe 701 and an UpLink (UL) subframe 702. The DL subframe 701 carries data from the BS to the MS (BS→MS: access zone) and data from the BS to the RS (BS→RS: relay zone). The access zone and the relay zone of the DL subframe 701 are separated based on the time. The UL subframe 702 carries data from the MS to the BS (MS→BS: access zone) and data from the RS to the BS (RS→BS: relay zone).

Likewise, an RS frame 710 for communications between the RS and the MS and communications between the RS and the BS includes a DL subframe 711 and the UL subframe 712. The DL subframe 711 carries data from the RS to the MS (RS→MS: access zone) and receives data from the BS to the RS (BS→RS: relay zone). The access zone and the relay zone of the DL subframe 711 are separated based on the time. The UL subframe 712 receives data from the MS to the RS (MS→RS: access zone) and carries data from the RS to the BS (RS→BS: relay zone).

According to the first scenario, the first transmission is made over the access zone (MS→RS) in the UL subframe 712 of the RS frame 710. The RS identifies a receiving terminal in its service coverage and makes the second transmission in the access zone (RS→MS) of the DL subframe 711 of the RS frame 710. That is, the BS frame 700 is not used because the communications between the RS and the BS or between the MS and the BS is unnecessary in the first scenario.

In FIG. 8, a BS frame 800 for communications between BS and RS and communications between BS and MS includes a DL subframe 801 and a UL subframe 802. The DL subframe 801 carries data from the BS to the MS (BS→MS: access zone) and data from the BS to the RS (BS→RS: relay zone). In the full-duplex communication, the access zone and the relay zone of the DL subframe 801 are not separated based on the time. The UL subframe 802 carries data from the MS to the BS (MS→BS: access zone) and data from the RS to the BS (RS→BS: relay zone). In the full-duplex communication, the access zone and the relay zone of the UL subframe 802 are not separated based on the time.

The RS frame for communications between the RS and the MS and communications between the RS and the BS includes an RS frame 810 of a first antenna for the reception and an RS frame 820 of a second antenna for the transmission. In the RS frame 810 of the first antenna, a DL subframe 811 carries data from the BS to the RS and a UL subframe 812 carries data from the MS to the RS. In the RS frame 820 of the second antenna, a DL subframe 821 carries data from the RS to the MS and a UL subframe 822 carries data from the RS to the BS. Accordingly, as the RS receives data from the BS over the DL subframe 811 of the RS frame 810 of the first antenna, the RS transmits data to the MS over the DL subframe 821 of the second RS frame 820 at the same time. As the RS receives data from the MS over the UL subframe 812 of the RS frame 810 of the first antenna, the RS transmits data to the BS over the UL subframe 822 of the RS frame 820 of the second antenna at the same time. Thus, the full-duplex communications are made.

According to the first scenario, the first transmission is made in the access zone (MS→RS) of the UL subframe 812 of the RS frame 810. The RS identifies a receiving terminal in its service coverage and makes the second transmission in the access zone (RS→MS) of the DL subframe 821 of the RS frame 820. That is, the BS frame 800 is not used because the communications between the RS and the BS or between the MS and the BS is unnecessary in the first scenario.

In the call setup, the RS 610 confirms a MAC address of the MS 612 and determines whether to perform the call setup procedure to the BS 600. Next, the RS 610 receives the data 613 from the MS 611 over the UL access zone and relays the data 614 to the MS 612 over the DL access zone of the next frame. Compared to the conventional method, the resources of the UL and DL relay zones can be saved. A signaling process for efficiently using the radio resources according to the first scenario is described in detail by referring to FIG. 15.

Figure 15:
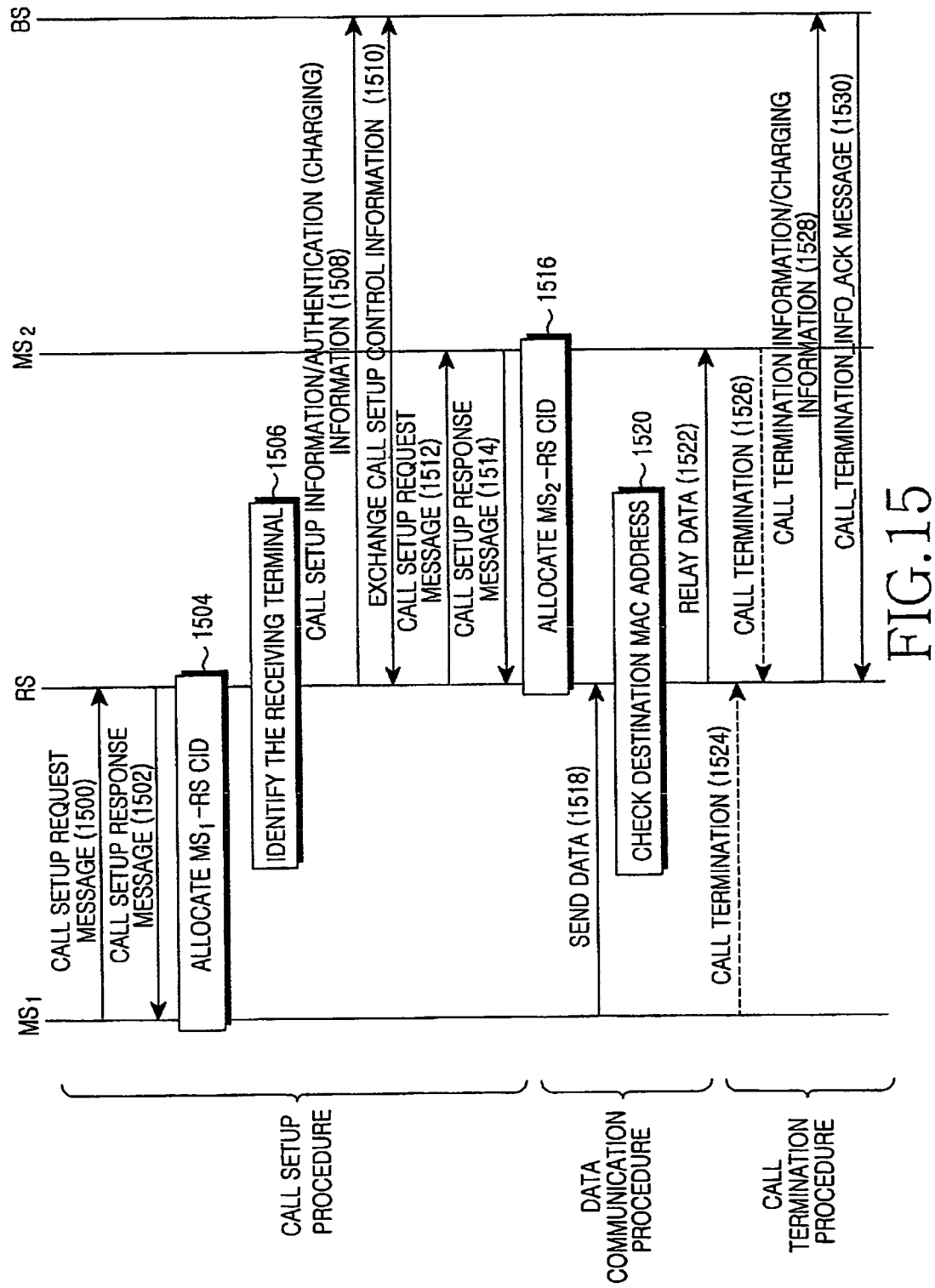
FIG. 15 illustrates a method for efficiently using radio resources in the communication scenario between the MSs in the same RS service coverage according to one exemplary embodiment of the present invention.

FIG. 15 illustrates a method for efficiently using radio resources in the communication scenario between the MSs in the same RS service coverage according one exemplary embodiment of the present invention. Herein, a call setup procedure, a data communication procedure, and a call termination procedure are described individually.

The MS 611 performs the call setup procedure for the data communications with the MS 612 as follows.

Figure 13:
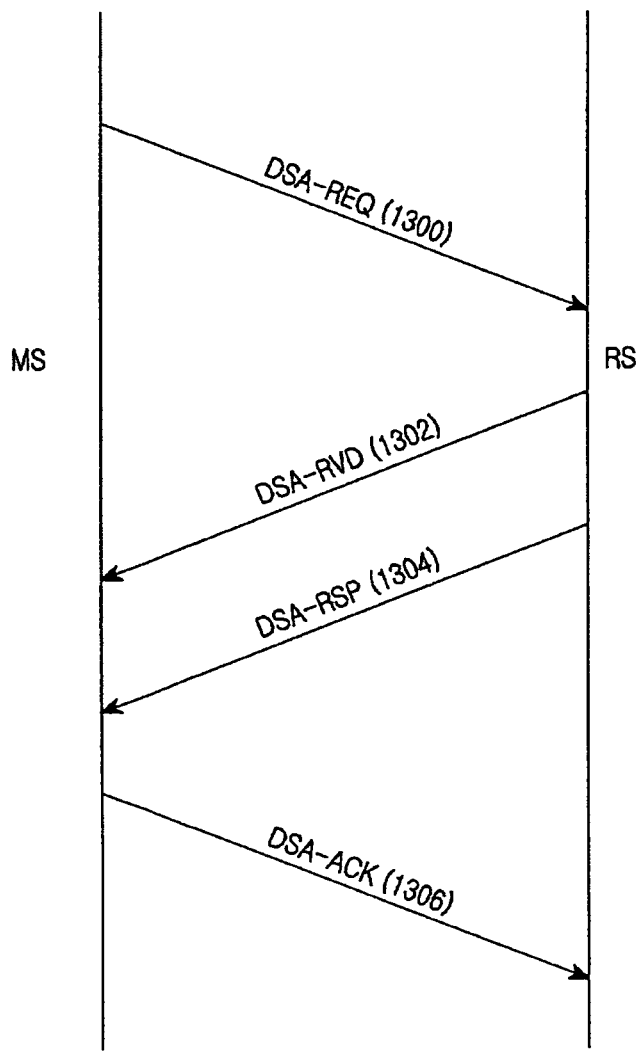
FIG. 13 illustrates an MS-RS service flow setting method in a broadband wireless communication system.

The MS 611 ($MS_1$) sends a request message for the call setup to the RS 610 in step 1500. The RS 610 sends a response message to the MS 611 ($MS_1$) in reply to the request message in step 1502. By exchanging those messages, the a Connection IDentifier (CID) can be allocated for the data communications between the MS 611 and the RS 610 in step 1504. For example, in the broadband wireless communication system, the MS may set the uplink call by exchanging DSA-REQ and DSA-RSP messages to generate a service flow to the BS. Referring to FIG. 13, in the broadband wireless communication system, the MS 611 sends a DSA-REQ message 1300 to the RS 610 and RS 610 sends a DSA-RVD message 1302 or a DSA-RSP message 1304 to the MS 611 to indicate the approval or the disapproval. Next, the MS 611 sends a DSA-ACK message 1306 to the RS 610.

Referring back to FIG. 15, the RS 610 identifies an MS with which the MS 611 intends to communicate data in step 1506. Herein, it is assumed that the MS 612 ($MS_2$) that is to communicate with the MS 611 ($MS_1$) exists within the coverage of the RS 610. In step 1508, the RS 610 sends a message for call setup information and authentication/charging to the BS 600, rather than for the call setup procedure to allocate the CID as shown in FIG. 13. That is, a transport CID is not allocated for the traffic data delivery between the RS 610 and the BS 600, whereas only the notification of the call setup is performed.

Figure 14:
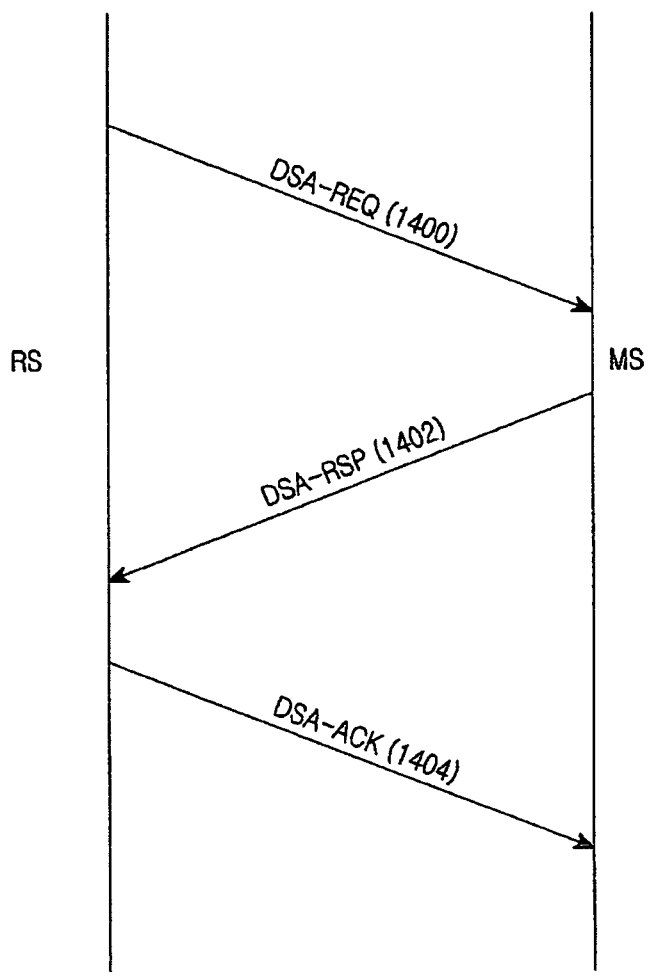
FIG. 14 illustrates an RS-MS service flow setting method in the broadband wireless communication system.

After exchanging control information of the call setup with the BS 600 in step 1510, the RS 610 sends a call setup request message to the MS 612 ($MS_2$) in step 1512. The MS 612 ($MS_2$) sends a response message of the request message to the RS 610 in step 1514. By exchanging the call setup related messages as above, the CID for the data communications between the RS 610 and MS 612 ($MS_2$) is allocated in step 1516. Referring to FIG. 14, in the broadband wireless communication system, the RS 610 exchanges a DSA-REQ message 1400, a DSA-RSP message 1402, and a DSA-ACK message 1404 with the MS 612 to generate the service flow and thus sets the downlink call.

After the call setup, the MS 611 ($MS_1$) and the MS 612 ($MS_2$) request a bandwidth for the data communications and are assigned the bandwidth.

Referring back to FIG. 15, the MS 611 ($MS_1$) transmits data packets to the RS 610 using the allocated bandwidth in step 1518. The RS 610 receives the data packets, decodes the corresponding packets, and then confirms the destination MAC address in step 1520. When the destination MAC address is the MAC address of the MS 612 ($MS_2$) in the coverage of the RS 610, the RS 610 relays the corresponding data packets directly to the MS 612 ($MS_2$) in step 1522, not to the BS 600. The RS 610 should store MAC addresses of MSs belonging to the RS 610. In doing so, using the CID allocated per MS, the half-duplex communications and the full-duplex communications both can be executed using the resources of the UL access zone and the DL access zone. In the centralized scheduling, the BS 600 allocates the resources and transmits the MAP information. In the distributed scheduling, the RS 610 allocates the resources and transmits the MAP information.

After the call termination between the MS 611 ($MS_1$) and the MS 612 ($MS_2$), the RS 610 needs to send information relating to the termination of the corresponding connection and the charging information to the BS 600. For example, the MS 611 ($MS_1$) sends a call termination message to the RS 610 in step 1524. In various implementations, the MS 612 ($MS_2$) may send the call termination message to the RS 610 in step 1526.

In step 1528, the RS 610 sends the call termination information/charging information message to the BS 600. In step 1530, the BS 600 sends a call_termination_info_ack message to the RS 610 in response.

Figure 9:
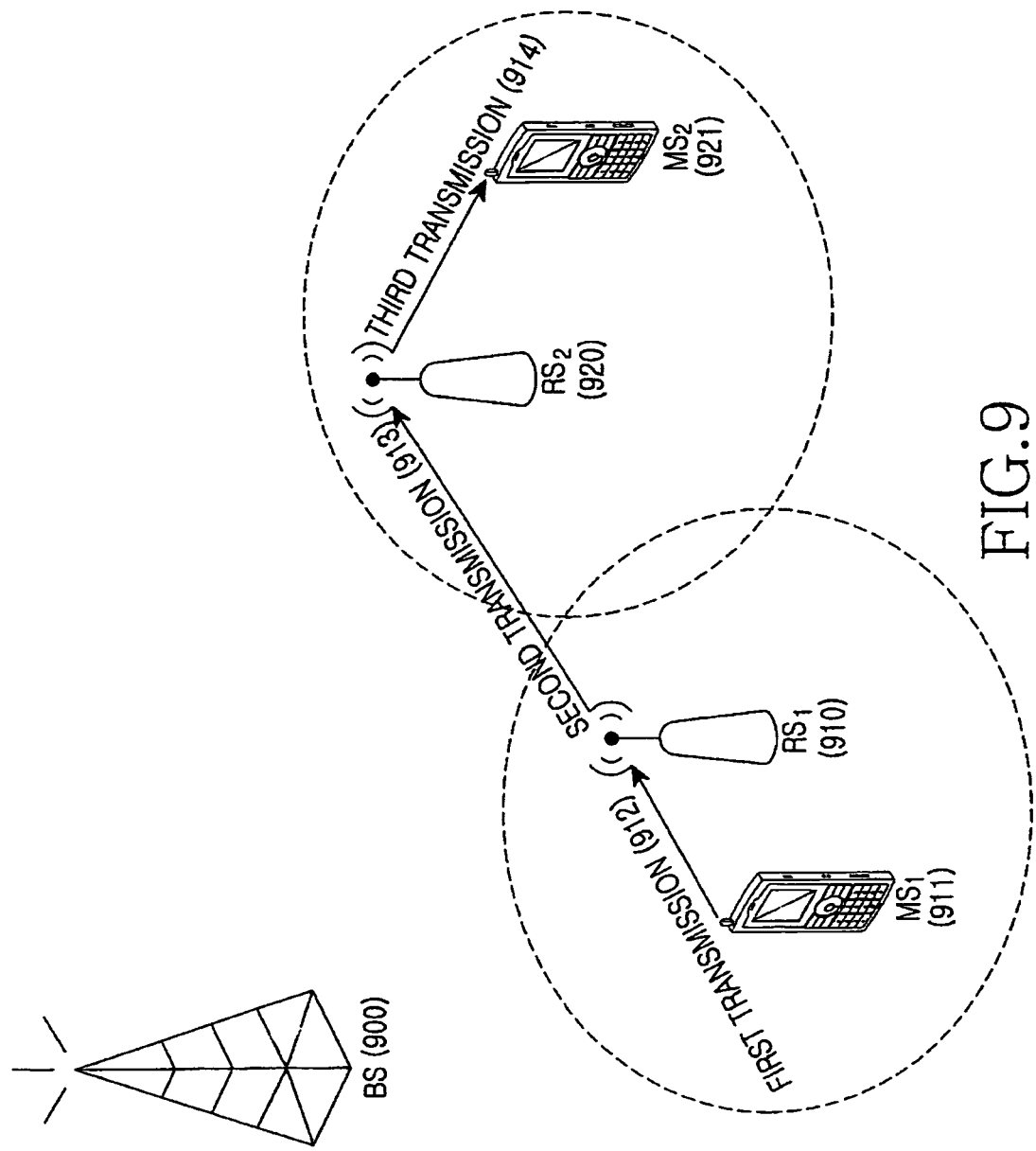
FIG. 9 illustrates a communication scenario between MSs in different RS service coverages within the same cell in a wireless communication system according to another exemplary embodiment of the present invention.

FIG. 9 illustrates a communication scenario (hereafter, referred to as a second scenario) between MSs in different RS service coverages within the same cell of a wireless communication system according another exemplary embodiment of the present invention.

Provided that an MS 911 ($MS_1$) transmits data to an MS 921 ($MS_2$), the first transmission 912 is made from the MS 911 ($MS_1$) to an RS 910 ($RS_1$), the second transmission 913 is made from the RS 910 ($RS_1$) to an RS 920 ($RS_2$), and the third transmission 914 is made from the RS 920 ($RS_2$) to the MS 921 ($MS_2$). Compared to the conventional method of FIG. 2, the communications according to the suggested scenario requires the radio resources only for the MS 911-RS 910 interval, the RS 910-RS 920 interval, and the RS 920-MS 921 interval. In conclusion, the present invention is advantageous more than the conventional method in terms of the radio resource efficiency.

Figure 10:
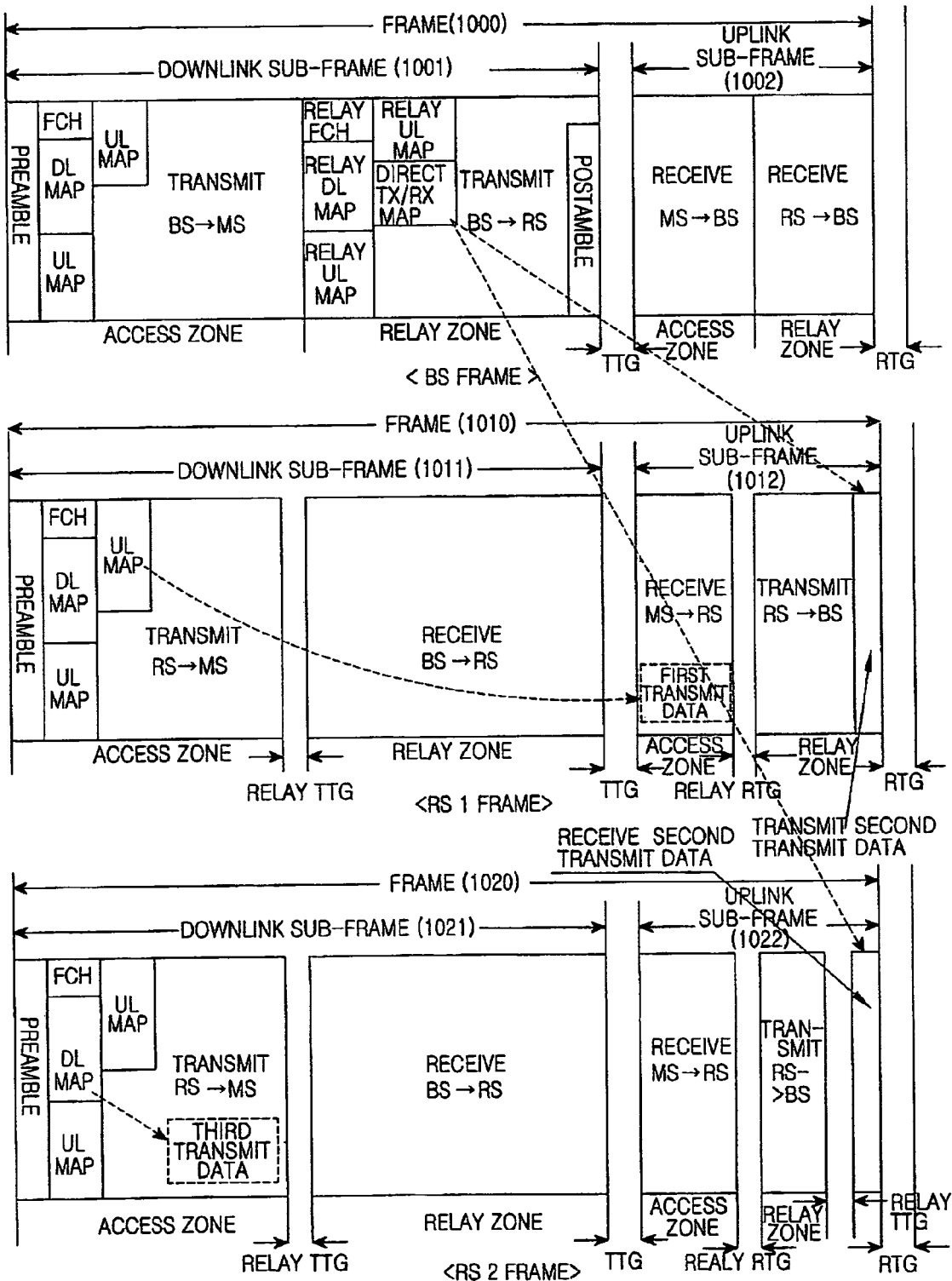
FIG. 10 illustrates a half-duplex frame structure of FIG. 9.
Figure 11A:
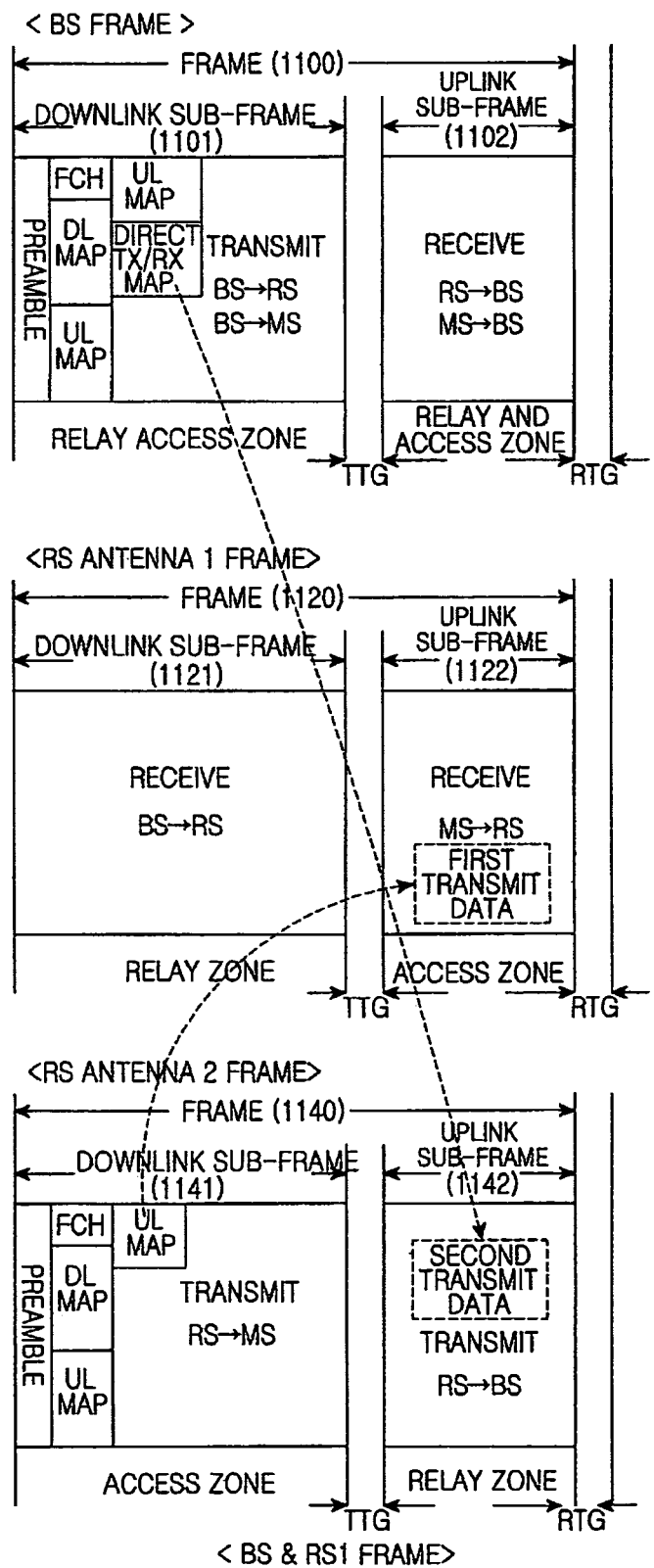
FIGS. 11A and 11B illustrate a full-duplex frame structure of FIG. 9.
Figure 11B:
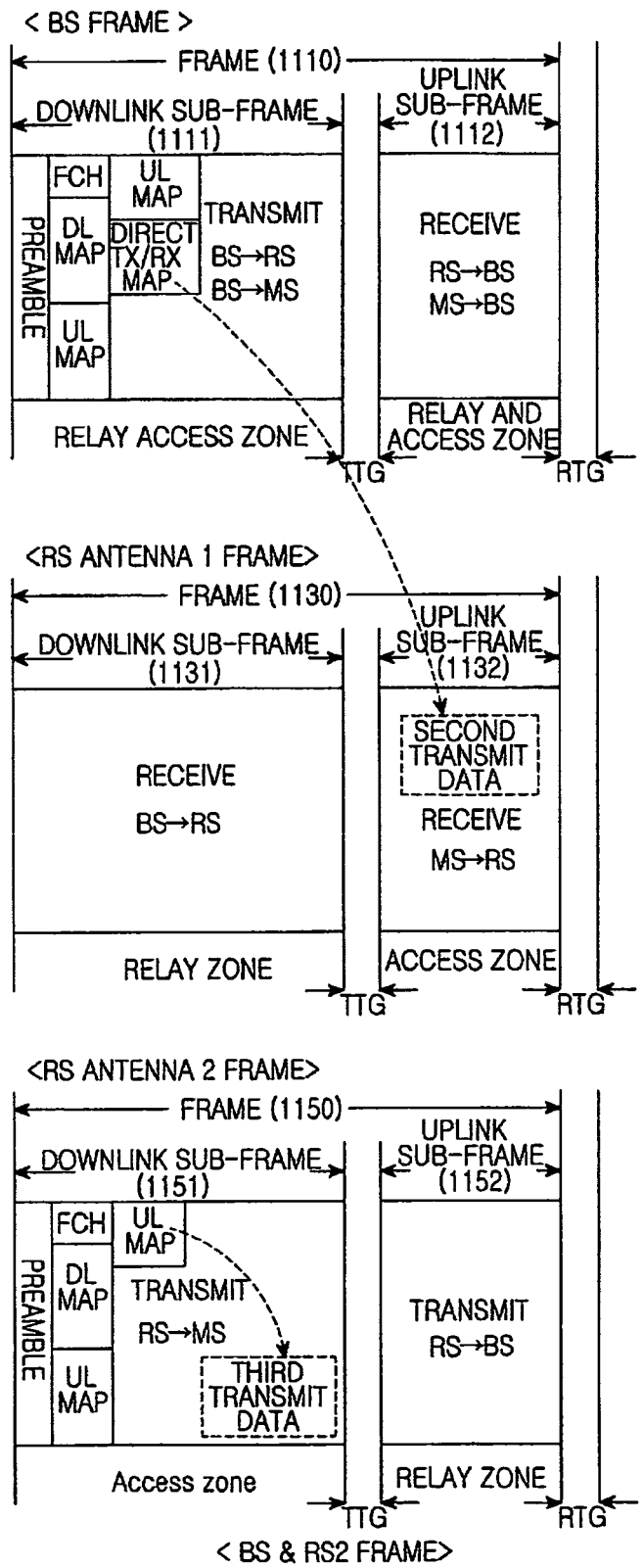

A basic frame structure for the second scenario is described by referring to FIG. 10 showing the half-duplex frame structure and FIG. 11 showing the full-duplex frame structure.

The half-duplex frame of FIG. 10 is similar to that of FIG. 7. Yet, since the second scenario assumes that the MSs exist in the different RS service coverage within the same cell, resource is required for communications between RSs while no resource is required for communications between the RS and the BS. Accordingly, the frame of FIG. 10 additionally includes the resources for the communications between the RSs, compared to the half-duplex frame of FIG. 7.

For example, according to the second scenario, the first transmission is made over the access zone (MS→RS) of the UL subframe 1012 of the first RS frame 1010. The RS identifies a receiving MS in the different RS service coverage within the same cell, and the BS allocates resource for the communications between the first RS 910 ($RS_1$) and the second RS 920 ($RS_2$). The BS 900 informs the first RS 910 and the second RS 920 of the allocated resource position through Direct Tx/Rx MAP information of the BS frame 1000. Herein, the resource regions for the second transmission between the first RS 910 and the second RS 920 are the relay zone of the UL subframe 1012 of the first RS frame 1010 and the relay zone of the UL subframe 1022 of the second RS frame 1020. Since the frame zone between the RS and the BS is not used, the frame zone between the RS and the BS is allocated and used as the second transmission zone. In doing so, additional TTG is required so that the second RS 920 needs to receive data in the time resource region of the transmission of the first RS 910. Finally, the third transmission is made over the access zone (RS→MS) of the DL subframe 1021 of the second RS frame 1020.

The full-duplex frame of FIG. 11 is similar to that of FIG. 8. Yet, since the second scenario assumes that the MSs exist in the different RS service coverages within the same cell, resource is required for communications between RSs while no resource is required for communications between the RS and the BS. Accordingly, the frame of FIG. 11 additionally includes the resources for the communications between the RSs, compared to the full-duplex frame of FIG. 8.

For example, according to the second scenario, the first transmission is made in the access zone (MS→RS) of the UL subframe 1122 of the frame 1120 of the first antenna for the first RS. Next, the RS identifies a receiving MS in the different RS service coverage within the same cell, and the BS allocates the resource for the communications between the first RS 910 and the second RS 920. The BS 900 informs the first RS 910 (RS$_1$) and the second RS 920 (RS$_2$) of the allocated resource position through Direct Tx/Rx MAP information of the BS frame 1100. Herein, the resource regions for the second transmission between the first RS 910 and the second RS 920 are the relay zone of the UL subframe 1142 of the second antenna frame 1140 for the first RS 910 and the relay zone of the UL subframe 1132 of the first antenna frame 1130 for the second RS 920. That is, when the second transmission is made in the relay zone of the UL frame 1142, the second transmission is received in the relay zone of the UL subframe 1132. Since the full-duplex scheme concurrently performs the transmission in the UL subframe 1142 and the reception in the UL subframe 1132 for the second transmission, additional relay TTG as in the half-duplex communications is unnecessary. In various implementations, the resource region for receiving the second transmission may use the relay zone of the DL subframe 1131 of the first antenna frame 1130 for the second RS 920.

Finally, the third transmission is made over the access zone (RS→MS) of the DL subframe 1151 of the second antenna frame 1150 for the second RS 920.

The communication resource in each link can use the access zone resource in the first transmission 912 and the third transmission 914. In the centralized scheduling, the BS 900 handles the resource allocation. In the distributed scheduling, the RSs 910 and 920 inform of the resource allocation using the MAP information. Herein, in the second transmission 913 between the RS 910 and the RS 920, the BS 900 allocates the resource, defines and sends the Direct Tx/Rx MAP information. FIG. 10 depicts the frame structure of the full-duplex scheme, and the communication resource between the RSs utilizes the resource of the relay zone. Since the second RS 920 needs to receive data in the time resource zone where the first RS 910 transmits data, additional relay TTG is required. FIG. 11 depicts the frame structure of the full-duplex scheme, and the BS 900 allocates and informs of the communication resource between the RSs using the Direct Tx/Rx MAP information. In the full-duplex communications, the RSs 910 and 920 perform the reception and the transmission at the same time. In doing so, since additional relay TTG as in the half-duplex communications is unnecessary, the present invention is very advantageous.

Figure 16:
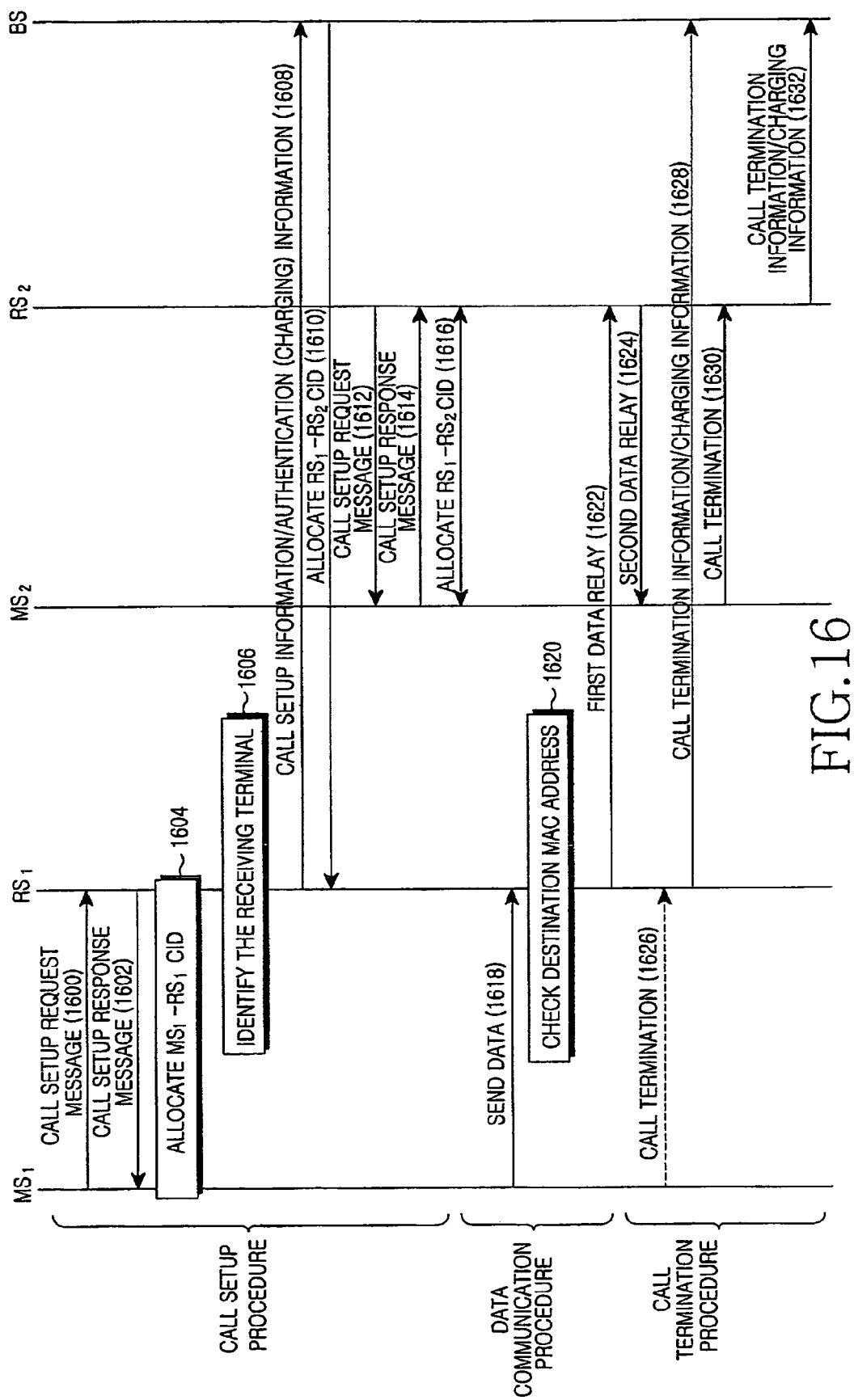
FIG. 16 illustrates a method for efficiently using radio resources in the communication scenario between the MSs in the different RS service coverages within the same cell according to another exemplary embodiment of the present invention.

FIG. 16 illustrates a method for efficiently using radio resources in the communication scenario between the MSs in the different RS service coverage within the same cell according another exemplary embodiment of the present invention. The call setup procedure, the data communication procedure, and the call termination procedure are described separately.

To communicate data with the MS 921 (MS$_2$), the MS 911 (MS$_1$) performs the call setup procedure as below. In step 1600, the MS 911 (MS$_1$) sends a call setup request message to the RS 910 (RS$_1$).

The RS 910 (RS$_1$) sends a response message to the MS 911 (MS$_1$) in response in step 1602. By exchanging those messages, a CID for the data communications between the MS 911 (MS$_1$) and the RS 910 (RS$_1$) can be allocated in step 1604. FIG. 13 is the flowchart of the call setup in the broadband wireless communication system.

In step 1606, the RS 910 (RS$_1$) identifies the MS with which the MS 911 (MS$_1$) intends to communicate. It is assumed that the MS 921 (MS$_2$) that is to communicate with the MS 911 (MS$_1$) exists within the coverage of the RS 920 (RS$_2$). In step 1608, the RS 910 (RS$_1$) sends a message for the call setup information and the authentication/charging, rather than perform the call setup procedure to allocate the CID as shown in FIG. 15. That is, no transport CID is allocated between the RS 910 (RS$_1$) and the BS 900, whereas only the notification of the call setup is performed.

Next, for the direction communications between the RS 910 (RS$_1$) and the RS 920 (RS$_2$), a new CID needs to be allocated. The BS 900 allocates this resource. For instance, the RS 910 (RS$_1$) sends a DSA-REQ message to the BS 900, and the BS 900 responds with the DSA-RSP message indicative of the approval or the disapproval. The RS 910 (RS$_1$) informs that the requested call concerns the connection to the RS 920 (RS$_2$), not the connection to the BS 900.

In step 1612, the RS 920 (RS$_2$) sends a call setup request message to the MS 921 (MS$_2$). The MS 921 (MS$_2$) sends a response message of the request message in step 1614. By exchanging the call setup related messages, the CID for the data communications between the RS 920 (RS$_2$) and the RS 910 (RS$_1$) is allocated in step 1616.

After the call setup, the MS 911 (MS$_1$) and the MS 921 (MS$_2$) request and get the bandwidth for the data communication.

In step 1618, the MS 911 (MS$_1$) transmits data packets to the RS 910 (RS$_1$) using the allocated bandwidth. After receiving the data packets, the RS 910 (RS$_1$) decodes the corresponding packets and checks a destination MAC address in step 1620. When the destination MAC address is a MAC address of the MS 921 (MS$_2$) existing in the coverage of the neighbor RS 920 (RS$_2$), the RS 910 (RS$_1$) relays the corresponding data packets directly to the RS 920 (RS$_2$), rather than to the BS 900. For doing so, the RS 910 (RS$_1$) should know MAC addresses of MSs belonging to the neighbor RS 920 (RS$_2$). To this end, a routing table is required. Information in the routing table includes field values relating to neighbor RS IDs, MAC addresses of MSs belonging to the corresponding RS, and so on.

After the call termination between the MS 911 (MS$_1$) and the MS 921 (MS$_2$), when the corresponding connection is terminated in step 1626, the RS 910 (RS$_1$) needs to transmit information relating to the call termination and the charging in step 1628. The RS 910 (RS$_1$) transmits the call termination information/charging information message to the BS 900 in step 1628. The MS 921 (MS$_2$) transmits the call termination information to the RS 920 (RS$_2$) in step 1630. The RS 920 (RS$_2$) transmits the call termination/charging information to the BS 900 in step 1632. In response, the BS 900 sends a call_termination_info_ack message to the RS 910 (RS$_1$) and to the RS 920 (RS$_2$) (in steps not shown in FIG. 16).

Figure 12:
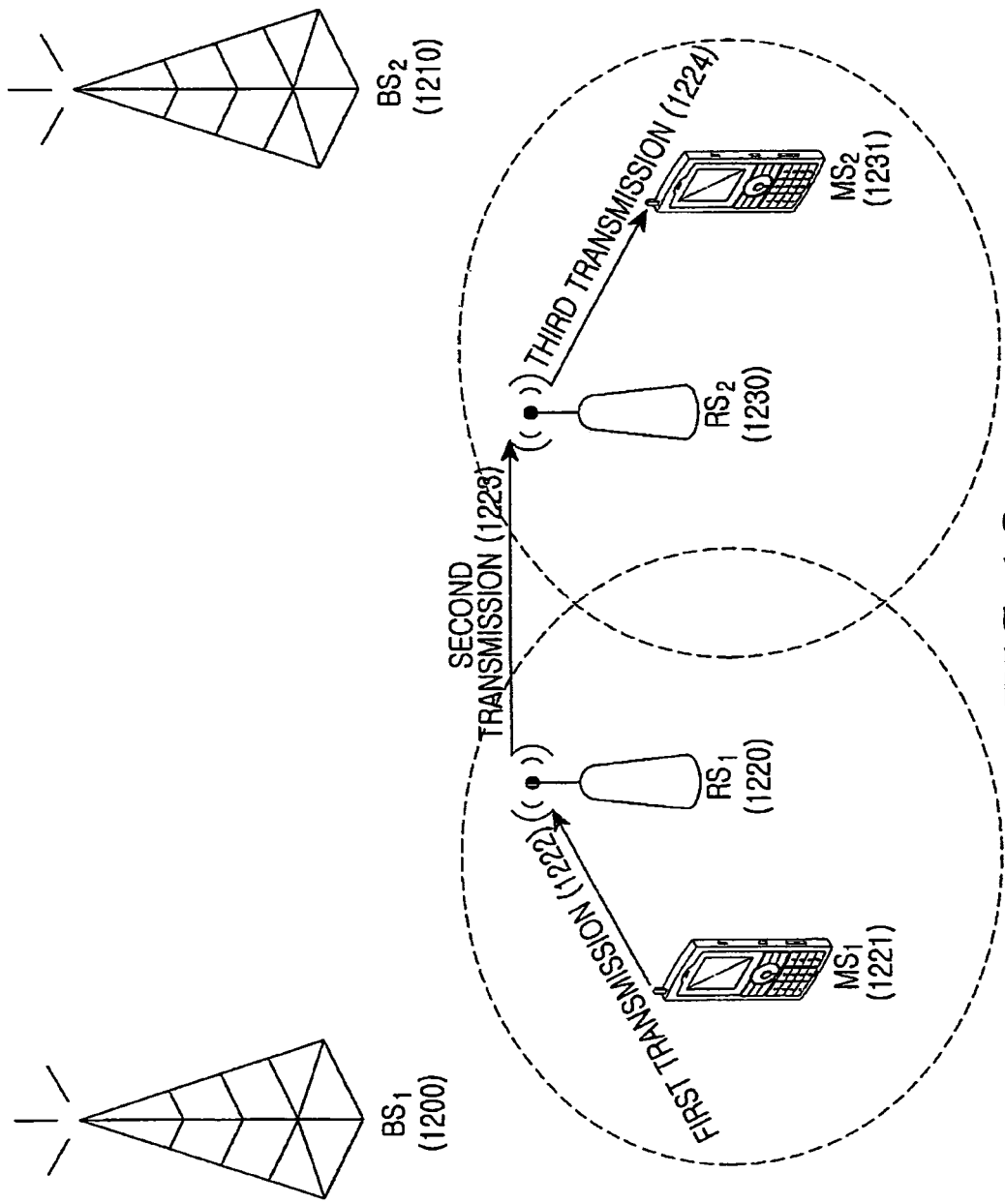
FIG. 12 illustrates a communication scenario between MSs in neighbor cells of a wireless communication system according to yet another exemplary embodiment of the present invention.

FIG. 12 illustrates a communication scenario between MSs in neighbor cells of a wireless communication system according to yet another exemplary embodiment of the present invention.

Figure 3:
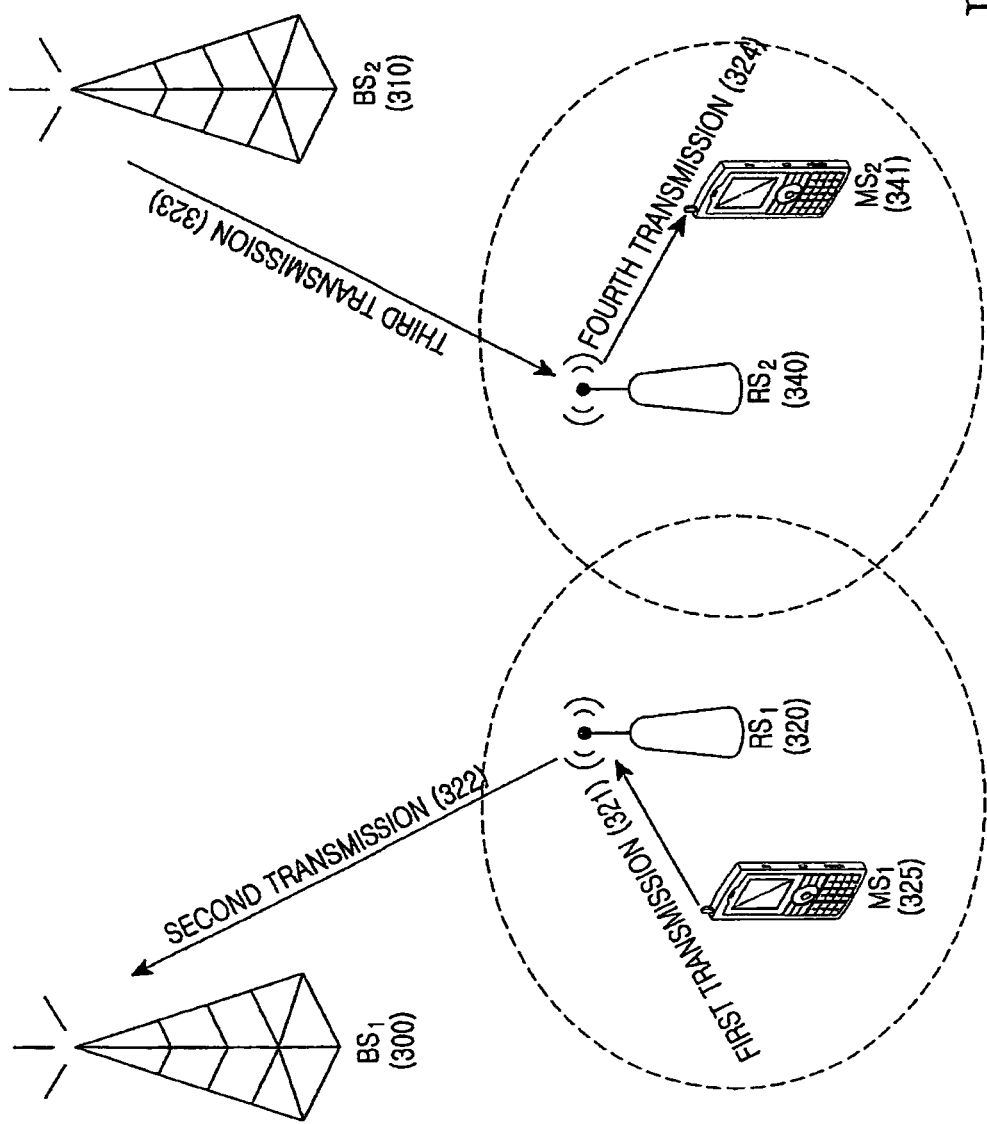
FIG. 3 illustrates a conventional communication scenario between MSs in neighbor cells of a wireless communication system.
Figure 4:
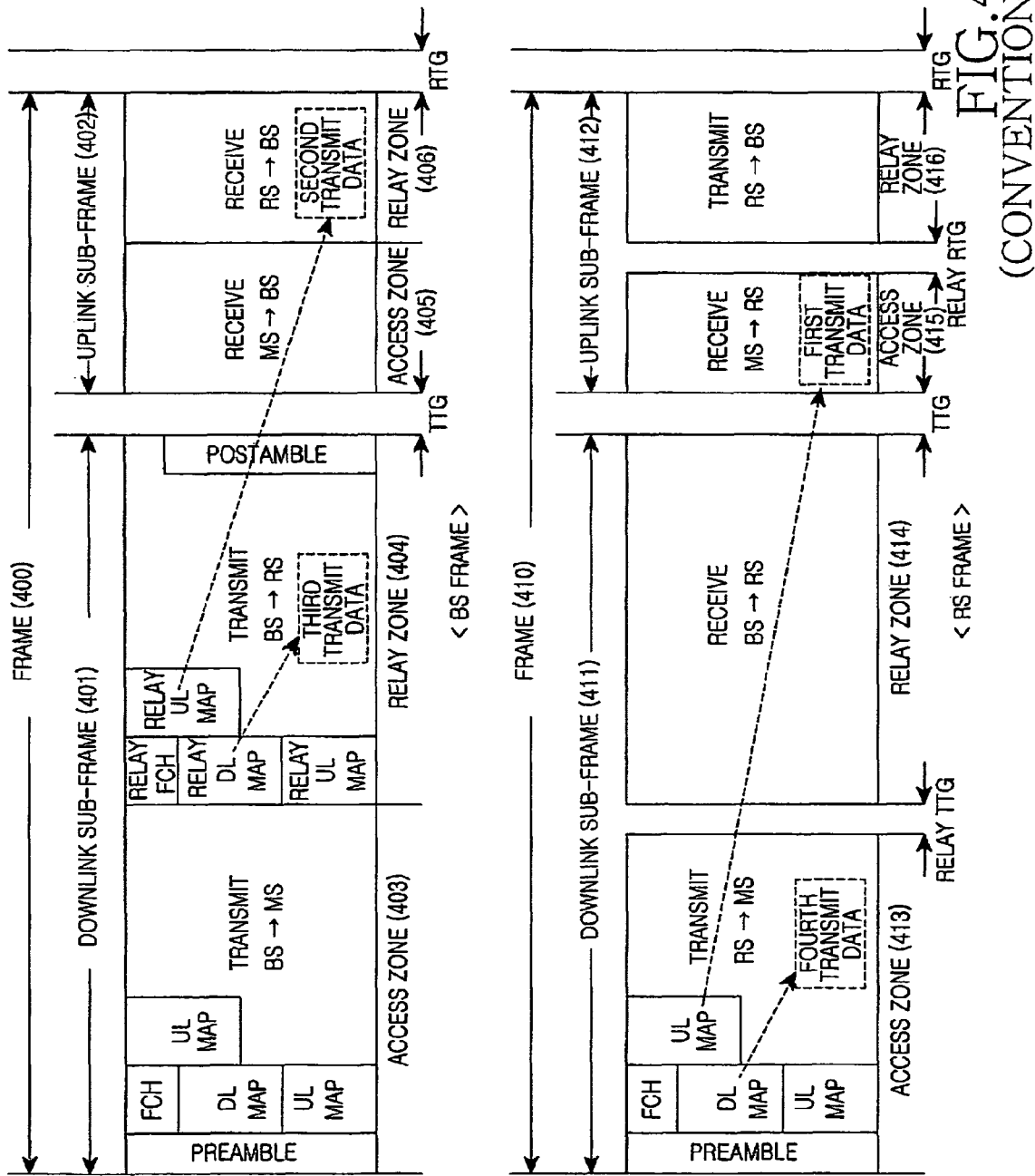
FIG. 4 illustrates a conventional half-duplex OFDM frame structure.
Figure 5:
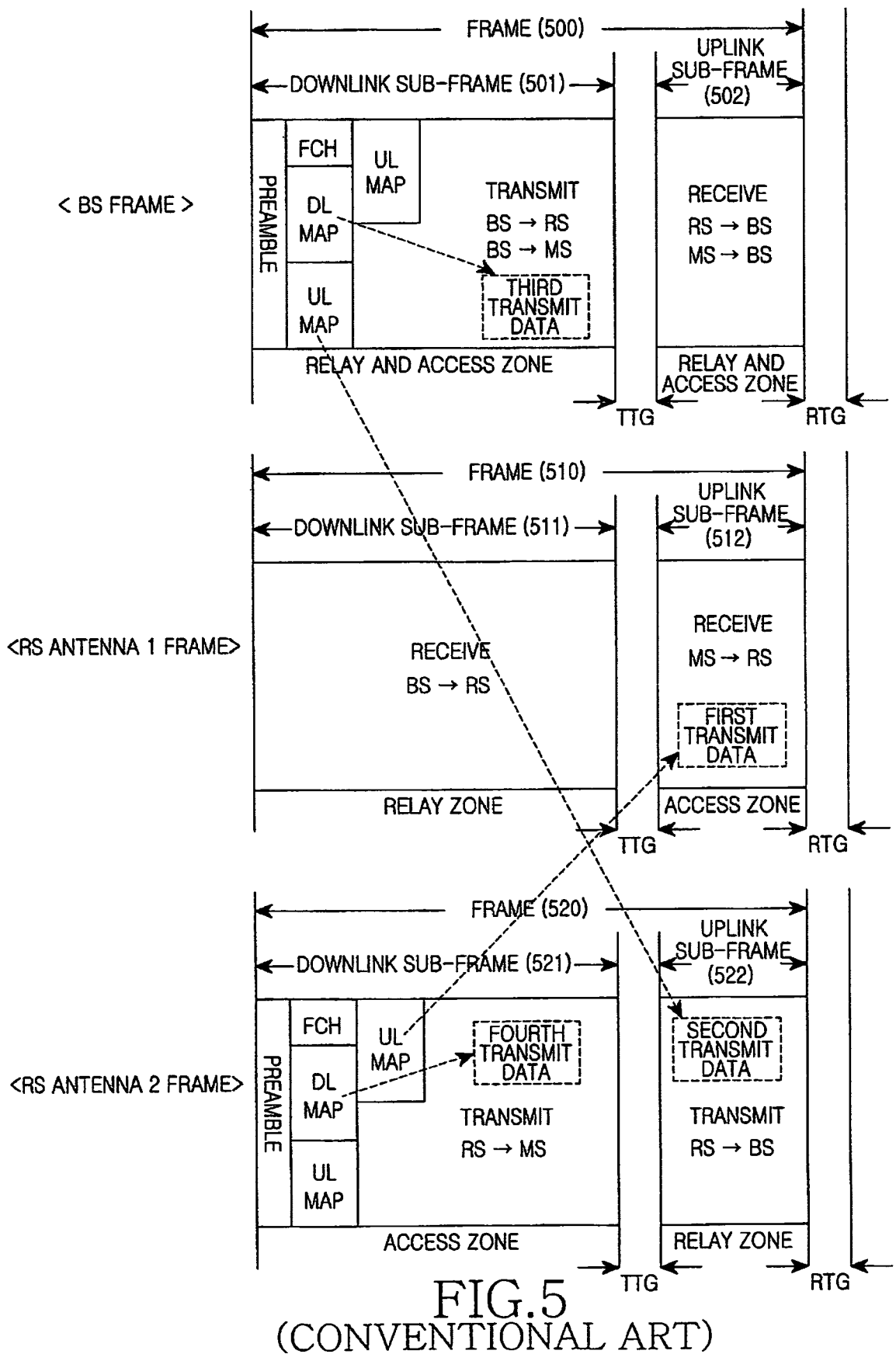
FIG. 5 illustrates a conventional full-duplex OFDM frame structure.

Provided that an MS 1221 (MS$_1$) transmits data to an MS 1231 (MS$_2$), the first transmission 1222 is made from the MS 1221 (MS$_1$) to an RS 1220 (RS$_1$), the second transmission 1223 is made from the RS 1220 (RS$_1$) to an RS 1230 (RS$_2$), and the third transmission 1224 is conducted from the RS 1230 (RS$_2$) to the MS 1231 (MS$_2$). Compared to the conventional method of FIG. 3, the communications according to the suggested scenario requires radio resources only for the MS 1221-RS 1220 interval, the RS 1220-RS 1230 interval, and the RS 1230-MS 1231 interval. Hence, the present invention is advantageous more than the conventional method in terms of the radio resource efficiency.

Figure 2:
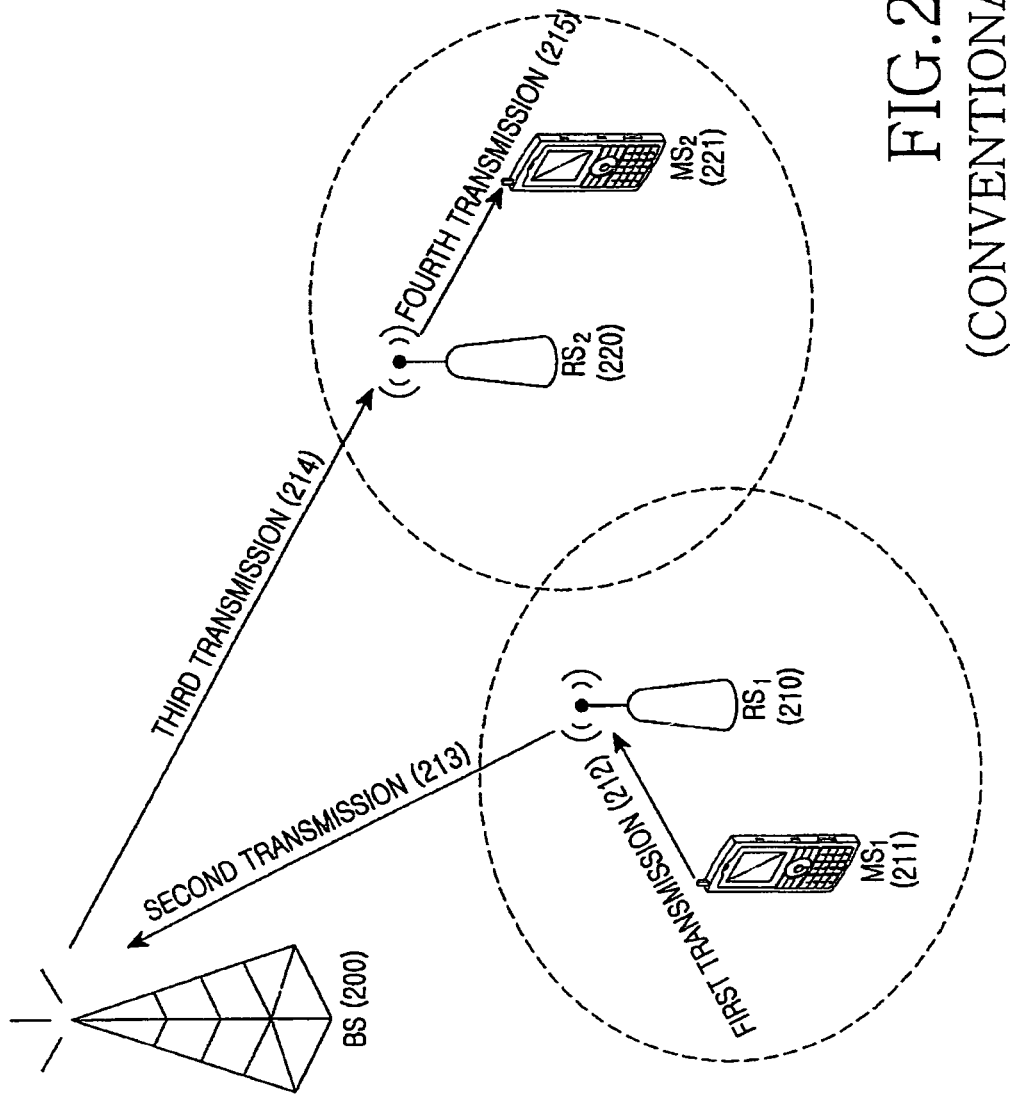
FIG. 2 illustrates a conventional communication scenario between MSs in different RS service coverages within the same cell in a wireless communication system.

The communication resource operation in each link in the first transmission 1222 and the third transmission 1224 are substantially the same as in FIG. 2. Yet in the second transmission 1223, the communication resource between the RSs should be designated. A BS 1200 (BS$_1$) or a BS 1210 (BS$_2$) can allocate the communication resource. Herein, the BS of the transmitting RS allocates the resource. In more detail, the BS 1200 (BS$_1$) allocates the communication resource between the RS 1220 (RS$_1$) and the RS 1230 (RS$_2$) and informs the BS 1210 (BS$_2$) of the resource allocation. Based on the shared RS resource allocation information, each BS informs the RS 1220 (RS$_1$) and the RS 1230 (RS$_2$) of the transmit resource position and the receive resource position of the second data transmission using the Direct Tx/Rx MAP message. The frame structure is the same as in the second scenario. Since the full-duplex communications requires no additional relay TTG, it is far more efficient.

Figure 17:
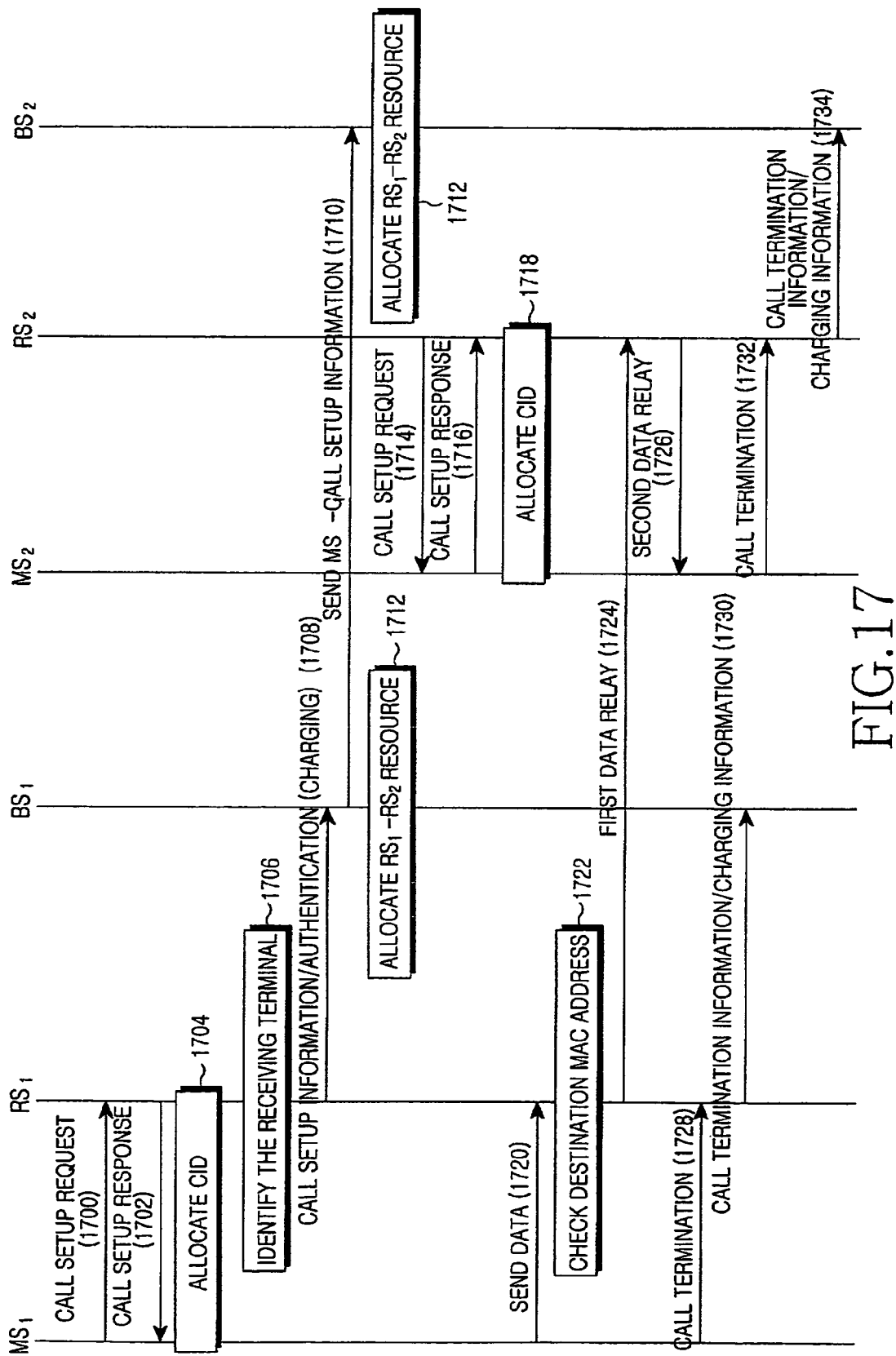
FIG. 17 illustrates a method for efficiently using radio resources in the communication scenario between the MSs in the neighbor cells according to yet another exemplary embodiment of the present invention.

FIG. 17 illustrates a method for efficiently using radio resources in the communication scenario between the MSs in the neighbor cells according to yet another exemplary embodiment of the present invention. The call setup procedure, the data communication procedure, and the call termination procedure are separately explained.

To communicate data with the MS 1231 (MS$_2$), the MS 1221 (MS$_1$) performs the call setup procedure as below.

The MS 1221 (MS$_1$) sends a call setup request message to the RS 1220 (RS$_1$) in step 1700. The RS 1220 (RS$_1$) sends a response message of the request message to the MS 1221 (MS$_1$) in step 1702. By exchanging those messages, a CID for the data communications between the MS 1221 (MS$_1$) and the RS 1220 (RS$_1$) can be allocated in step 1704.

In step 1706, the RS 1220 (RS$_1$) identifies an MS with which the MS 1221 (MS$_1$) intends to communicate data. It is assumed that the MS 1231 (MS$_2$) that is to communicate with the MS 1221 (MS$_1$) exists within the coverage of the RS 1230 (RS$_2$). The RS 1220 (RS$_1$) sends a message for the call setup information and the authentication/charging to the BS 1200 (BS$_1$) in step 1708, rather than performs the call setup procedure to allocate the CID as shown in FIG. 13 or FIG. 14. In other words, the transport CID is not allocated between the RS 1220 (RS$_1$) and the BS 1200 (BS$_1$), and only the notification of the call setup is performed.

Next, the BS 1200 (BS$_1$) transmits the call setup information of the MS 1221 (MS$_1$) and the MS 1231 (MS$_2$) to the BS 1210 (BS$_2$) over the backbone network in step 1710. In doing so, it is necessary to determine whether the BS 1200 (BS$_1$) or the BS 1210 (BS$_2$) allocates the communication resource between the RS 1220 (RS$_1$) and the RS 1230 (RS$_2$). In this exemplary embodiment, the BS of the RS which transmits data allocates the resource. Thus, the RS 1220 (RS$_1$) sends a DSA-REQ message to the BS 1200 (BS$_1$), and the BS 1200 (BS$_1$) responds with a DSA-RSP message indicative of the approval or the disapproval, which are not illustrated in FIG. 17. The RS 1220 (RS$_1$) informs that the requested call pertains to the connection to the RS 1230 (RS$_2$), rather than the connection to the BS.

Next, the RS 1230 (RS$_2$) sends a call setup request message to the MS 1231 (MS$_2$) in step 1714. The MS 1231 (MS$_2$) sends a response message of the request message to the RS 1230 (RS$_2$) in step 1716. By exchanging the call setup related messages, a CID for the data communications between the RS 1230 (RS$_2$) and the MS 1231 (MS$_2$) is allocated in step 1718.

After the call setup, the MS 1221 (MS$_1$) and the MS 1231 (MS$_2$) request and get a bandwidth for the data communications. The MS 1221 (MS$_1$) transmits data packets to the RS 1220 (RS$_1$) using the allocated bandwidth in step 1720. After receiving the data packets, the RS 1220 (RS$_1$) decodes the corresponding packets and checks a destination MAC address in step 1722. When the destination MAC address is a MAC address of the MS 1231 (MS$_2$) in the coverage of the neighbor RS 1230 (RS$_2$), the RS 1220 (RS$_1$) relays the corresponding data packets directly to the RS 1230 (RS$_2$) in step 1724, not to the BS 1200 (BS$_1$). For doing so, the RS 1220 (RS$_1$) should know MAC addresses of MSs belonging to the neighbor RSs. To this end, a routing table is required. Information in the routing table includes field values relating to neighbor RS ID, MAC address of MS belonging to the corresponding RS, and so forth.

After the call termination between the MS 1221 (MS$_1$) and the MS 1231 (MS$_2$), when the MS 1221 (MS$_1$) sends a call termination message to the RS 1220 (RS$_1$) in step 1728, the RS 1220 (RS$_1$) transmits call termination information/charging information to the BS 1200 (BS$_1$) in step 1730. In various implementations, when the MS 1231 (MS$_2$) sends a call termination message to the RS 1230 (RS$_2$) in step 1732, the RS 1230 (RS$_2$) transmits call termination information/charging information to the BS 1210 (BS$_2$) in step 1734. Next, the BS 1200 (BS$_1$) or the BS 1210 (BS$_2$) sends a call_termination_info_ack message to the RS 1220 (RS$_1$) or the RS 1230 (RS$_2$) (in steps not shown in FIG. 17).

Figure 18:
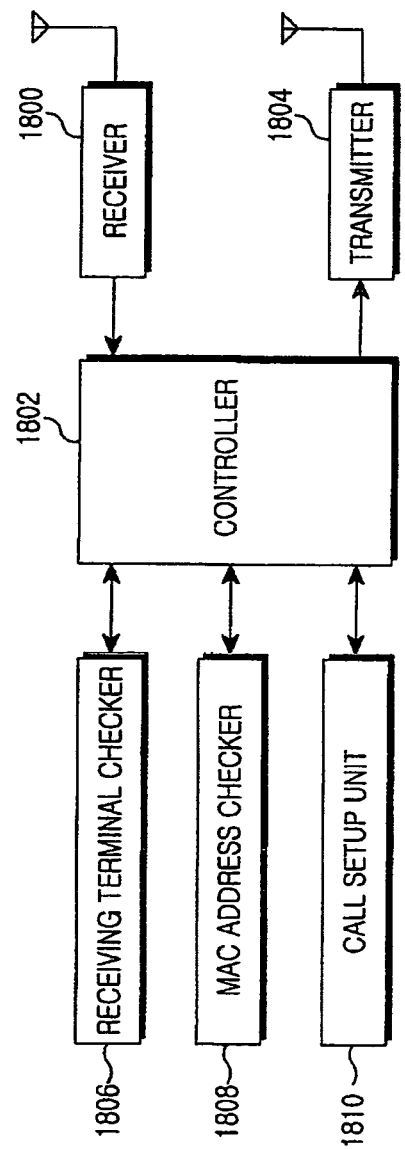
FIG. 18 illustrates an RS for efficiently using radio resources in the communication scenario between the MSs in the neighbor cells according to an exemplary embodiment of the present invention.

FIG. 18 is a block diagram of an RS for efficiently using radio resources in the communication scenario between the MSs in the neighbor cells according to an exemplary embodiment of the present invention.

The RS of FIG. 18 includes a receiver 1800, a controller 1802, a transmitter 1804, a receiving terminal checker 1806, a MAC address checker 1808, and a call setup unit 1810.

The receiver 1800 converts a radio frequency (RF) signal received via an antenna to a baseband analog signal, demodulates and decodes the baseband analog signal according to a preset modulation level (modulation and coding scheme (MCS) level), and outputs the decoded signal to the controller 1802.

The controller 1802 processes the information output from the receiver 1800 and provides the result to the transmitter 1804. In addition, the controller 1802 receives location information of the receiving terminal from the receiving terminal checker 1802 and controls the call setup in relation with the receiving terminal.

The transmitter 1804 encodes and modulates the data according to the preset modulation level (MCS level). Next, the transmitter 1804 converts the modulated signal to an RF signal and transmits the RF signal over the antenna.

When the call setup request is received from the sending terminal, the receiving terminal checker 1806 locates the receiving terminal in relation with the sending terminal. How to locate the terminal departs from the scope of the invention.

The MAC address checker 1808 can determine whether to relay data to the BS or to directly transmit to the neighbor RS or the receiving terminal, by checking the MAC address of the packet data of the sending terminal.

In the call setup, the call setup unit 1810 generates the call setup request message and the call setup response message and exchanges the messages with the corresponding MS or BS.

Figure 19:
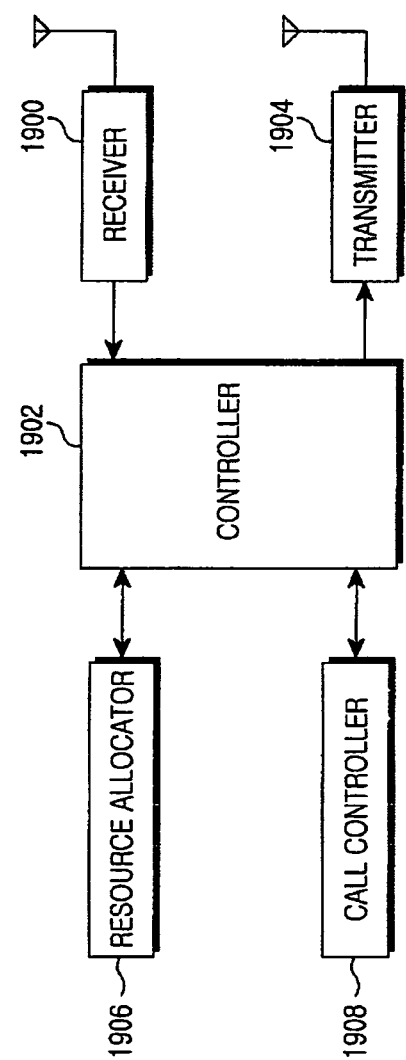
FIG. 19 illustrates a BS for efficiently using radio resources in the communication scenario between the MSs in the neighbor cells according to an exemplary embodiment of the present invention.

FIG. 19 is a block diagram of a BS for efficiently using radio resources in the communication scenario between the MSs in the neighbor cells according to an exemplary embodiment of the present invention.

The BS of FIG. 19 includes a receiver 1900, a controller 1902, a transmitter 1904, a resource allocator 1906, and a call controller 1908.

The receiver 1900 and the transmitter 1904 function substantially the same as in FIG. 18 and thus are not further described.

When the sending terminal and the receiving terminal are traveling in the same RS service coverage, the controller 1902 receives the message including the call setup information and the authentication/charging information from the RS and exchanges the call setup control information with the RS. When the sending terminal and the receiving terminal are traveling in the first RS service coverage and the second RS service coverage within the same cell, the resource allocator 1906 allocates the CID for the connection between the first RS and the second RS. The call controller 1908 transmits the call setup information of the sending terminal and the receiving terminal to the corresponding BS.

As set forth above, in the wireless communication system based on the RS, the efficient utilization of the radio resources can save the resources and reduce the data transmission delay.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method of a relay station (RS) for using radio resources in a wireless communication system based on the relay station, the method comprising:
   setting a call with a sending mobile station;
   checking whether a receiving mobile station associated with the sending mobile station exists in the same RS cell, in a different RS cell of the same base station (BS) cell, or in a different cell of a neighbor base station as compared to the sending mobile station; and
   when the receiving mobile station exists in the same RS cell as the sending mobile station, relaying the data from the sending mobile station through the RS directly to the receiving mobile station such that no radio resource for a connection to the serving base station is allocated,
   wherein, when the receiving mobile station exists in a different RS cell of the same BS cell, no radio resource is allocated for a connection to the serving base station, a resource for the connection between relay stations is allocated from the serving base station, and the data of the sending mobile station is relayed to the receiving mobile station through the connection between the relay stations.

2. The operating method of claim 1, further comprising:
   transmitting information relating to the call setup to the serving base station,
   wherein a transport connection identifier (CID) is not allocated for a connection to the serving base station and a notification of the call setup is performed.

3. The operating method of claim 1, wherein, when the receiving mobile station exists in a neighbor cell of a different base station, no radio resource for a connection to the serving base station is allocated, a resource for the connection between relay stations is allocated from the serving base station, and the data of the sending mobile station is relayed to the receiving mobile station through the connection between the relay stations.

4. The operating method of claim 3, wherein a resource zone for the connection between the relay stations reuses an unused resource zone for the connection between the base station and the relay station.

5. The operating method of claim 1, further comprising:
   when receiving a call termination message from the sending mobile station or the receiving mobile station, transmitting a call termination information to the corresponding base station.

6. An operating method of a base station (BS) for efficiently using radio resources in a wireless communication system based on a relay station (RS), the method comprising:
   receiving a call setup information from a relay station;
   allocating resources for a connection between the relay station, a sending mobile station, and a receiving mobile station when the sending mobile station and the receiving mobile station exist in the same RS cell of the same BS cell, such that no radio resource for a connection with the base station is allocated; and
   allocating a resource for the connection between relay stations when the sending mobile station and the receiving mobile station exist in a different RS cell of the same BS cell, such that no radio resource for a connection between the base station and the relay station is allocated,
   wherein the data of the sending mobile station is relayed to the receiving mobile station through the connection between the relay stations.

7. The operating method of claim 6, wherein a resource zone for the connection between the relay station and the mobile stations reuses an unused resource zone for the connection between the base station and the relay station.

8. An apparatus for a relay station (RS) for using radio resources in a wireless communication system based on the relay station, comprising:
   a call setup unit configured to set up a call with a sending mobile station;
   a receiving terminal checker configured to check whether a receiving mobile station associated with the sending mobile station exists in the same RS cell, in a different RS cell of the same base station (BS) cell, or in a different cell of a neighbor base station as compared to the sending mobile station; and
   a controller configured, when the receiving mobile station exists in the same RS cell as the sending mobile station, to relay the data from the sending mobile station directly to the receiving mobile station such that no radio resource for a connection to the serving base station is allocated,
   wherein, when the receiving mobile station exists in a different RS cell of the same BS cell, no radio resource is allocated for a connection to the serving base station, a resource for the connection between relay stations is allocated from the serving base station, and the data of the sending mobile station is relayed to the receiving mobile station through the connection between the relay stations.

9. The apparatus of claim 8, further comprising:
   a transmitter configured to transmit information relating to the call setup to the serving base station, wherein a transport connection identifier (CID) is not allocated for a connection to the serving base station and a notification of the call setup is performed.

10. The apparatus of claim 8, wherein, when the receiving mobile station exists in a neighbor cell of a different base station, no radio resource for a connection to the serving base station is allocated, a resource for the connection between relay stations is allocated from the serving base station, and the data of the sending mobile station is relayed to the receiving mobile station through the connection between the relay stations.

11. The apparatus of claim 10, wherein a resource zone for the connection between the relay stations reuses an unused resource zone for the connection between the base station and the relay station.

12. The apparatus of claim 8, wherein the call setter, when receiving a call termination message from the sending mobile station or the receiving mobile station, transmits a call termination information to the corresponding base station.

13. An apparatus for a base station (BS) for efficiently using radio resources in a wireless communication system based on a relay station (RS), comprising:
a controller configured to receive a call setup information from a relay station; and
a resource allocator configured to allocate resources for a connection between the relay station, a sending mobile station, and a receiving mobile station when the sending mobile station and the receiving mobile station exist in the same RS cell of the same BS cell, such that no radio resource for a connection with the base station is allocated,
wherein the resource allocator further configured to allocate a resource for the connection between relay stations when the sending mobile station and the receiving mobile station exist in a different RS cell of the same BS cell, such that no radio resource for a connection between the base station and the relay station is allocated,
wherein the data of the sending mobile station is relayed to the receiving mobile station through the connection between the relay stations.

14. The apparatus of claim 13, wherein a resource zone for the connection between the relay station and the mobile stations reuses an unused resource zone for the connection between the base station and the relay station.

15. The operating method of claim 2, wherein, when the receiving mobile station exists in a neighbor cell of a different base station, no radio resource for a connection to the serving base station is allocated, a resource for the connection between relay stations is allocated from the serving base station, and the data of the sending mobile station is relayed to the receiving mobile station through the connection between the relay stations.

16. The operating method of claim 15, wherein a resource zone for the connection between the relay stations reuses an unused resource zone for the connection between the base station and the relay station.

17. The apparatus of claim 9, wherein, when the receiving mobile station exists in a neighbor cell of a different base station, no radio resource for a connection to the serving base station is allocated, a resource for the connection between relay stations is allocated from the serving base station, and the data of the sending mobile station is relayed to the receiving mobile station through the connection between the relay stations.

18. The apparatus of claim 17, wherein a resource zone for the connection between the relay stations reuses an unused resource zone for the connection between the base station and the relay station.

19. The operating method of claim 5, wherein, when the receiving mobile station exists in a neighbor cell of a different base station, no radio resource for a connection to the serving base station is allocated, a resource for the connection between relay stations is allocated from the serving base station, and the data of the sending mobile station is relayed to the receiving mobile station through the connection between the relay stations.

20. The apparatus of claim 12, wherein, when the receiving mobile station exists in a neighbor cell of a different base station, no radio resource for a connection to the serving base station is allocated, a resource for the connection between relay stations is allocated from the serving base station, and the data of the sending mobile station is relayed to the receiving mobile station through the connection between the relay stations.

* * * * *